US012780685B1

(12) United States Patent
Farooq et al.

(10) Patent No.: US 12,780,685 B1
(45) Date of Patent: Nov. 3, 2026

(54) MULTIPLE-LAYER SOLAR-DRIVEN DESALINATION SYSTEM

(71) Applicant: PRINCE MOHAMMAD BIN FAHD UNIVERSITY, Dhahran (SA)

(72) Inventors: Muhammad Farooq, Dhahran (SA); Muhammad Imran Khan, Dhahran (SA); Noreen Sher Akbar, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/647,737

(22) Filed: Apr. 14, 2026

(51) Int. Cl.
*C02F 1/14* (2023.01)
*B82B 1/00* (2006.01)
*B82B 3/00* (2006.01)
*C02F 103/08* (2006.01)

(52) U.S. Cl.
CPC ................ *C02F 1/14* (2013.01); *B82B 1/008* (2013.01); *B82B 3/0038* (2013.01); *C02F 2103/08* (2013.01); *C02F 2201/009* (2013.01)

(58) Field of Classification Search
CPC ........................................................ C02F 1/14
See application file for complete search history.

(56) References Cited

U.S. PATENT DOCUMENTS

2019/0060840 A1 2/2019 Fortner et al.
2019/0106335 A1 * 4/2019 Zhu ......................... F24S 70/10

(Continued)

FOREIGN PATENT DOCUMENTS

CN 106809897 A * 6/2017 ................ C02F 1/14
CN 110240731 A 9/2019
CN 119331456 A 1/2025

OTHER PUBLICATIONS

English machine translation of CN-106809897-A (Year: 2017).*

(Continued)

*Primary Examiner* — Renee Robinson
(74) *Attorney, Agent, or Firm* — Oblon, McClelland, Maier & Neustadt, L.L.P.

(57) ABSTRACT

A solar-driven desalination system includes a longitudinal photothermal evaporator incorporating a photothermal layer formed from three-dimensional graphene oxide-metal oxide (3D GO-MO) nanoscrolls decorated with metal oxide nanoparticles on the inner and outer scroll surfaces. The 3D GO-MO nanoscrolls exhibit controlled helical geometries, hierarchical porosity, and radially graded diameters to enhance solar absorption and vapor release. A thermal insulation layer having anisotropic thermal conductivity and embedded microvoid channels is positioned beneath the photothermal layer, while a microfluidic wicking lattice delivers saltwater through interconnected microchannels and hydrophilic fibers. A vapor-transport architecture positioned above the photothermal layer includes a curved transparent membrane, hydrophobic interior surfaces, and microtransport channels with variable-diameter segments, micropillar lattices, and condensate-bypass grooves. Condensers located at opposing ends of the evaporator incorporate microfin cooling arrays and anti-fouling coatings to maintain a temperature differential and promote efficient vapor condensation.

10 Claims, 13 Drawing Sheets

(56) References Cited

U.S. PATENT DOCUMENTS

| | | | | |
|---|---|---|---|---|
| 2023/0219829 A1* | 7/2023 | Soliman | B01D 1/0035 | 210/774 |
| 2023/0264114 A1* | 8/2023 | Zheng | B01D 1/0035 | 210/242.1 |

OTHER PUBLICATIONS

Yi-Ping Liu, et al., "Rational design of three-dimensional graphene/graphene oxide-based architectures for the efficient adsorption of contaminants from aqueous solutions", Journal of Molecular Liquids, vol. 343, Dec. 1, 2021, 117709, Excerpts only, 8 pages.

* cited by examiner

C1 (t=0 ps)

C2 (t=660 ps)

C3 (t=1100 ps)

C4 (t=2020 ps)

C5 (t=2600 ps)

C6 (t=3720 ps)

C7 (t=3910 ps)

C8 (t=4109 ps)

Lateral view (Perspective)

Front view (Orthographic)

MULTIPLE-LAYER SOLAR-DRIVEN DESALINATION SYSTEM

BACKGROUND

Technical Field

The present disclosure is directed to a solar-thermal water treatment system and, more particularly, to a solar-driven desalination system that integrates nanoscale photothermal materials, microfluidic water-delivery structures, engineered vapor-transport pathways, and thermally optimized condensation architectures.

Description of Related Art

The "background" description provided herein is for the purpose of presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Access to freshwater remains a critical global challenge, particularly in regions lacking reliable energy infrastructure. Solar-driven desalination has emerged as a promising passive technology; however, existing systems suffer from significant limitations in photothermal efficiency, vapor transport throughput, thermal gradient stability, and long-term operational durability. Conventional photothermal evaporators rely on two-dimensional graphene sheets, carbon foams, or polymeric absorbers that exhibit limited light-trapping capability, insufficient water infiltration pathways, and poor thermal confinement. These materials lack the hierarchical porosity, controlled helical geometry, and dual-surface functionalization required to sustain high evaporation flux under variable solar conditions.

In addition, prior-art solar stills employ bulk water reservoirs or simple wicking structures that cannot maintain continuous capillary flow at elevated salinity levels. Salt accumulation, pore blockage, and back-diffusion of ions frequently degrade performance. Existing insulation layers often exhibit isotropic thermal conductivity, resulting in heat loss to the bulk water and reduced photothermal efficiency.

Vapor transport in conventional systems is governed by unstructured headspace diffusion, which leads to turbulence, vapor stagnation, and droplet coalescence. Such architectures lack micro-engineered flow pathways, variable-diameter channels, or flow-stabilizing features capable of maintaining axial vapor momentum. Transparent covers used in prior systems are flat, uncoated, and thermally unregulated, contributing to condensation on the cover surface and reduced vapor throughput.

Condensation efficiency in existing solar desalination devices is further limited by the use of planar metal plates or uncoated surfaces that exhibit poor droplet shedding, fouling, and insufficient heat transfer. These condensers rarely incorporate microfin arrays, anti-fouling coatings, or thermally conductive base structures capable of maintaining a controlled temperature differential relative to the evaporator.

The present disclosure addresses these deficiencies by introducing a nanostructured photothermal layer comprising three-dimensional graphene oxide-metal oxide (3D GO-MO) nanoscrolls with engineered helical geometries, hierarchical pore networks, and dual-surface decoration with metal oxide nanoparticles. The system further incorporates anisotropic thermal insulation, microfluidic wicking lattices, curved transparent membranes, microtransport channels with flow-stabilizing micropillar lattices, and high-efficiency condensers with microfin cooling arrays. These integrated features overcome the limitations of prior-art systems by enhancing solar absorption, water delivery, vapor transport, and condensation efficiency in a passive, scalable desalination platform.

SUMMARY

In an exemplary embodiment, a solar-driven desalination system is described. The system includes a longitudinal photothermal evaporator comprising a photothermal layer formed from three-dimensional graphene oxide-metal oxide (3D GO-MO) nanoscrolls decorated with second-metal-oxide nanoparticles on both the inner and outer surfaces of the scrolls. The nanoscrolls may exhibit a helical pitch between about 50 and 500 nm, scroll-wall thickness between about 5 and 50 nm, internal channel diameters between about 20 and 300 nm, lateral dimensions between about 5 and 200 μm, aspect ratios between about 10:1 and 200:1, and helical curvature uniformity with longitudinal pitch deviations within about 5 to 20 nm. In certain embodiments, the nanoscroll population includes radially graded scroll diameters ranging from about 50 to 150 nm in an inner region and about 150 to 500 nm in an outer region to enhance light trapping and vapor escape.

In certain embodiments, the photothermal layer further comprises a hierarchical pore network with pore diameters between about 10 and 500 nm and patterned hydrophilic-hydrophobic regions configured to direct water infiltration into the scroll interiors while promoting vapor release from the scroll exteriors. The second metal-oxide nanoparticles may include $MoS_2$, $V_2O_5$, $AgVO_3$, CuO, $Co_3O_4$, $WO_3$, or NiO, with inner-surface particle diameters between about 2 and 10 nm, outer-surface diameters between about 10 and 50 nm, axial surface-density gradients between about $10^9$ and $10^{12}$ particles $cm^{-2}$, and nanoscale cluster sizes between about 5 and 100 nm.

In certain embodiments, a thermal insulation layer is positioned beneath the photothermal layer and includes an anisotropic thermal conductivity profile in which the in-plane thermal conductivity is at least twice the through-plane conductivity. The insulation layer may further include radiative-reflective microdomains such as silica microspheres, hollow glass particles, or alumina platelets; hydrophobic and hydrophilic coatings on opposing surfaces; and embedded microvoid channels configured to trap stagnant air and maintain a vertical thermal gradient.

In certain embodiments, a microfluidic wicking lattice positioned beneath the insulation layer delivers saltwater to the photothermal layer through interconnected microchannels arranged in helical, orthogonal, or radial-spoke geometries. The lattice may include hydrophilic fibers such as polyvinyl alcohol fibers, cellulose-based plant fibers, or cotton microbundles having surface energies between about 40 and 75 $mN \cdot m^{-1}$ to sustain capillary flow at salinity levels up to about 20 wt. %.

In certain embodiments, a vapor transport architecture is disposed above the photothermal layer and includes a transparent membrane positioned between about 5 and 15 mm above the photothermal surface, having a radius of curvature between about 20 and 150 mm. The membrane may be formed from borosilicate glass, fused silica, polycarbonate, polyethylene terephthalate, or fluorinated ethylene propylene. The vapor-transport architecture may further include hydrophobic interior coatings and a thermally conductive support frame formed from aluminum, copper, anisotropic pyrolytic graphite, or thermally conductive polymer composites to maintain longitudinal and radial thermal gradients.

In certain embodiments, the vapor transport architecture includes microtransport channels having hydraulic diameters between about 50 and 500 μm, throat region diameters between about 20 and 150 μm, channel lengths between about 2 and 50 mm, and groove aspect ratios between about 2 and 10. Each microtransport channel may include a variable-diameter segment to accelerate vapor flow, a micropillar lattice with pillar heights between about 20 and 200 μm and center-to-center spacing between about 30 and 300 μm to stabilize laminar flow, and condensate-bypass grooves to prevent droplet obstruction.

In certain embodiments, condensers positioned at the first and second ends of the evaporator include hydrophobic or nano-textured surface coatings, condensate-routing microchannels, anti-fouling coatings such as graphene-based or diamond-like carbon coatings, and microfin arrays having fin heights between about 0.5 and 10 mm and fin spacing between about 0.2 and 2 mm. A thermally conductive base plate may maintain a temperature at least 5° C. below the vapor-transport architecture to promote efficient condensation.

In certain embodiments, the 3D GO-MO nanoscrolls are formed by reacting graphene oxide sheets with first metal-oxide nanoparticles at temperatures between about 120 and 200° C. for 6 to 24 hours to form a GO-MO hydrogel, followed by supercritical drying, fragmentation of the resulting aerogel, and scrolling of the flakes using sonication, chemical intercalation, thermal treatment, or pH-triggered curling.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
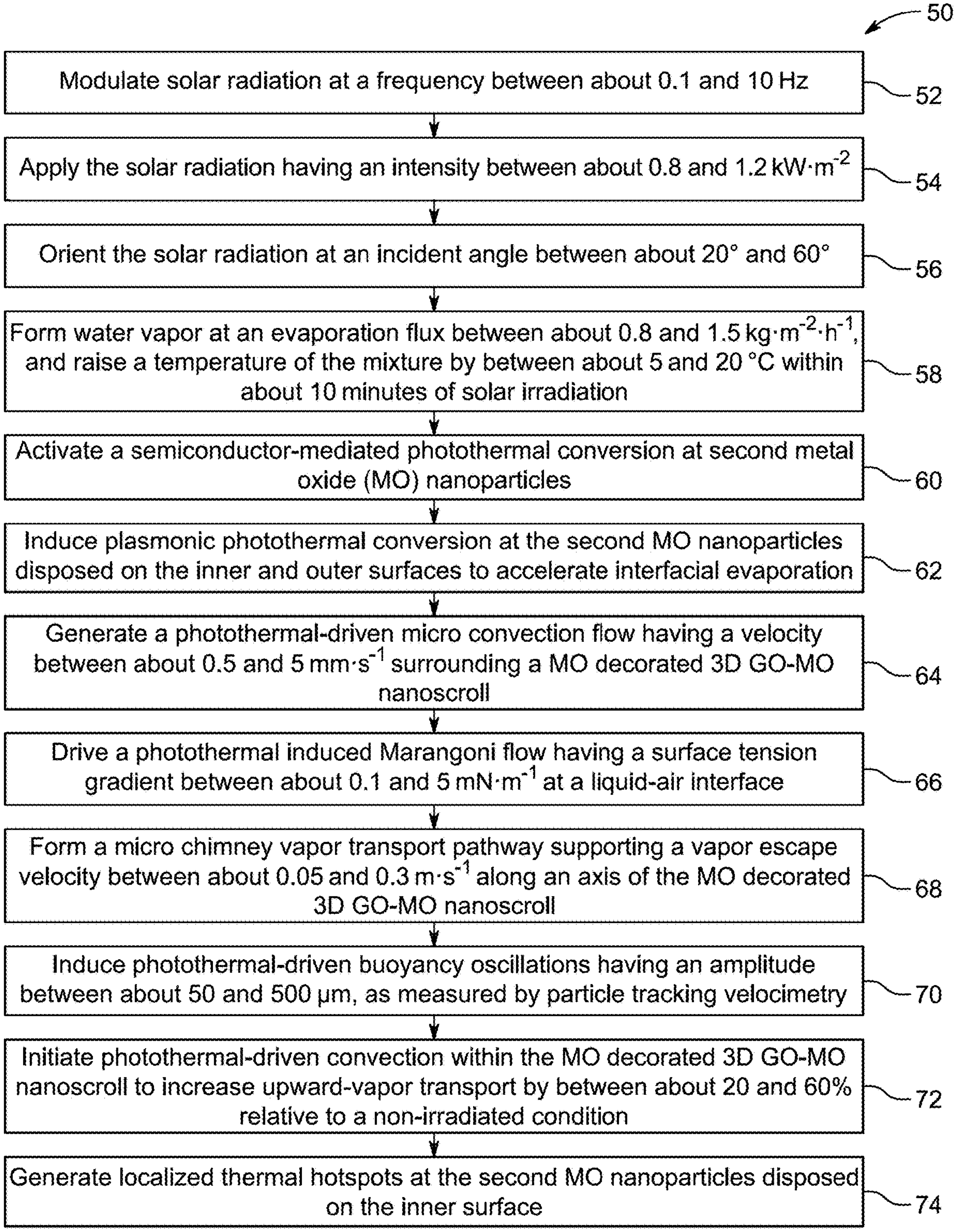
FIG. 1A is an exemplary flowchart of a method of irradiating a mixture of saltwater and a MO-decorated three-dimensional (3D) graphene oxide-metal oxide (GO-MO) nanoscroll with solar radiation, according to certain embodiments.

In the drawings, reference numerals designate identical or corresponding parts throughout the several views. Further, as used herein, the words “a”, “an”, and the like carry a meaning of “one or more”, unless stated otherwise.

Furthermore, the terms “approximately,” “approximate”, “about,” and similar terms refer to ranges that include the identified value within a margin of 20%, 10%, or preferably 5%, and any values therebetween.

As used herein, the term “horizontal axis” refers to a reference direction parallel to the plane of the photothermal layer or the supporting substrate.

As used herein, the term “vertical axis” refers to a reference direction perpendicular to the plane of the photothermal layer or the supporting substrate.

As used herein, the term “microtransport channels” refers to vapor transport pathways with microscale hydraulic diameters and configured to direct, accelerate, or stabilize vapor flow within the vapor transport architecture.

As used herein, the term "water vapor" refers to the gaseous phase of water generated by photothermal evaporation within the system.

As used herein, the term "hierarchical pore network" refers to a multiscale arrangement of pores having distinct size regimes configured to enhance water infiltration, vapor release, or light absorption.

As used herein, the term "patterned hydrophilic region" refers to a surface domain engineered to exhibit preferential water wetting and capillary uptake.

As used herein, the term "patterned hydrophobic surface region" refers to a surface domain engineered to exhibit reduced water wetting and enhanced vapor release.

As used herein, the term "axially aligned arrays" refers to ordered arrangements of nanostructures in which the longitudinal axes of the structures are oriented in a common direction.

As used herein, the term "scroll axes" refers to the longitudinal axes of the helical or rolled nanoscroll structures.

As used herein, the term "helical pitch" refers to the axial distance between successive turns of a nanoscroll's helical structure.

As used herein, the term "radially graded diameter distribution" refers to a variation in scroll diameter from an inner region to an outer region of a nanoscroll assembly.

As used herein, the term "scroll-wall thickness" refers to the thickness of the rolled graphene-oxide and metal-oxide composite layers forming the nanoscroll wall.

As used herein, the term "internal channel diameter" refers to the diameter of the hollow interior passage formed within a nanoscroll.

As used herein, the term "lateral dimension" refers to the characteristic width or length of a nanoscroll flake or structure measured perpendicular to the scroll axis.

As used herein, the term "aspect ratio" refers to the ratio of the nanoscroll's length to its diameter.

As used herein, the term "helical curvature uniformity" refers to the consistency of the helical pitch or curvature along the length of a nanoscroll.

As used herein, the term "axial surface-density gradient" refers to a variation in nanoparticle surface density along the longitudinal axis of a nanoscroll.

As used herein, the term "anisotropic thermal-conductivity profile" refers to a thermal-transport characteristic in which heat conduction differs between in-plane and through-plane directions.

As used herein, the term "radiative-reflective microdomains" refers to embedded particles or platelets configured to scatter or reflect infrared or visible radiation.

As used herein, the term "embedded microvoid channels" refers to internal voids or air-filled pathways within the insulation layer configured to trap stagnant air and reduce heat transfer.

As used herein, the term "interconnected microchannels" refers to a network of fluid transport pathways configured to deliver water via capillary action.

As used herein, the term "lateral diffusion pathway" refers to a microfluidic region configured to divert or redistribute salt ions away from the photothermal interface.

As used herein, the term "network of a hydrophilic fiber" refers to an assembly of water-wetting fibers configured to sustain capillary flow within the wicking lattice.

As used herein, the term "transparent membrane" refers to an optically transmissive layer positioned above the photothermal layer and configured to permit solar irradiation while shaping vapor flow.

As used herein, the term "support frame" refers to a structural component configured to maintain the position, curvature, and thermal gradients of the transparent membrane.

As used herein, the term "variable-diameter segment" refers to a microchannel region having a constricted throat and expanded sections configured to modulate vapor velocity and pressure.

As used herein, the term "micropillar lattice" refers to an array of microscale pillars disposed within a microchannel to stabilize vapor flow and prevent channel collapse.

As used herein, the term "condensate-bypass grooves" refers to drainage pathways formed along a microchannel wall and configured to divert condensed droplets away from the vapor-flow pathway.

As used herein, the term "hydraulic diameter" refers to the average dimension of a microchannel defined by four times the cross-sectional area divided by the wetted perimeter.

As used herein, the term "throat-region diameter" refers to the minimum diameter of a constricted microchannel segment.

As used herein, the term "condensate-routing microchannels" refers to microchannels configured to direct condensed water toward a collection reservoir.

As used herein, the term "collection reservoir" refers to a structure configured to receive and store condensed freshwater.

As used herein, the term "anti-fouling coating" refers to a surface treatment configured to inhibit the deposition of salts, particulates, or biological contaminants.

As used herein, the term "convective cooling surface" refers to a heat-exchange surface configured to enhance convective heat transfer through fins or microstructures.

As used herein, the term "base plate" refers to a thermally conductive component configured to maintain a temperature differential relative to the vapor-transport architecture.

As used herein, the term "scrolling stimulus" refers to an applied mechanical, chemical, thermal, or pH-based trigger that induces curling or rolling of GO-MO flakes into nanoscrolls.

Aspects of this disclosure are directed to a solar-driven desalination system that integrates nanostructured photothermal materials, microfluidic water-delivery architectures, engineered vapor-transport pathways, and thermally optimized condensation assemblies to enable high-efficiency freshwater generation under natural sunlight. The disclosure is directed to photothermal evaporators incorporating three-dimensional graphene oxide-metal oxide (3D GO-MO) nanoscrolls with controlled helical geometries, hierarchical pore networks, radially graded scroll diameters, and dual-surface decoration with metal oxide nanoparticles to enhance broadband solar absorption, water infiltration, and vapor release. The disclosure further includes anisotropic thermal insulation layers; microfluidic wicking lattices configured for continuous capillary flow under high salinity; vapor transport architectures incorporating curved transparent membranes and micro-engineered flow channels, and condenser structures employing microfin cooling arrays and anti-fouling coatings to maintain efficient vapor condensation and heat rejection.

In certain embodiments, a solar-driven desalination system includes a longitudinal photothermal evaporator extending between a first end and a second end. The photothermal evaporator may be configured to receive incident solar irradiation and convert the absorbed energy into localized heating, thereby generating water vapor. In certain embodiments, the photothermal evaporator comprises a photothermal layer formed from a plurality of three-dimensional graphene oxide-metal oxide (3D GO-MO) nanoscrolls. The nanoscrolls may be produced from graphene oxide sheets that are scrolled into helical, tubular, or partially open cylindrical structures and subsequently decorated with a second metal oxide (MO) nanoparticle. In certain embodiments, the second MO nanoparticles are disposed on both the inner and outer surfaces of the nanoscrolls to enhance broadband solar absorption, increase photothermal conversion efficiency, and promote rapid vapor generation. The nanoscrolls may be oriented along at least one of a horizontal axis or a vertical axis relative to the longitudinal direction of the photothermal evaporator to optimize light trapping, water infiltration, and vapor escape.

In certain embodiments, the longitudinal photothermal evaporator comprises an elongated body configured to establish a directional thermal and vapor-flow environment extending from the first end toward the second end. The evaporator may include a structural backbone formed from a mechanically rigid yet thermally stable substrate that supports the photothermal layer while maintaining dimensional stability under repeated solar-thermal cycling. In certain embodiments, the substrate may be formed from a ceramic composite, a carbon-based laminate, or a thermally stable polymeric sheet engineered to withstand temperatures generated during peak solar irradiation.

In certain embodiments, the longitudinal geometry of the evaporator is determined to promote unidirectional vapor migration and minimize lateral vapor dispersion. The evaporator may exhibit an aspect ratio sufficient to generate a sustained axial temperature gradient, wherein the central region attains a higher steady-state temperature relative to the terminal regions. This axial gradient may be engineered to couple with the vapor-transport architecture positioned above the photothermal layer, thereby enhancing vapor propulsion toward the condensers located at the first and second ends.

In certain embodiments, the upper surface of the evaporator includes a photothermal interface region configured to maximize solar absorption across ultraviolet, visible, and near-infrared wavelengths. The interface region may incorporate light-trapping geometries such as shallow surface corrugations, tapered ridges, or micro-textured domains that increase the effective optical path length and reduce specular reflection. These surface features may be patterned along the longitudinal direction to maintain uniform irradiance distribution and prevent localized overheating.

In certain embodiments, the longitudinal photothermal evaporator includes lateral confinement structures positioned along its edges. These confinement structures may be configured to prevent water overflow, maintain the spatial integrity of the wicking interface, and reduce evaporative losses to the surrounding environment. The confinement structures may also serve as mechanical anchors for the transparent membrane or vapor-transport architecture, thereby preserving the vertical spacing between the membrane and the photothermal surface.

In certain embodiments, the longitudinal photothermal evaporator incorporates thermal-spreading layers positioned beneath or adjacent to the photothermal layer. These layers may include high-conductivity pathways oriented along the longitudinal axis to equalize temperature distribution and reduce thermal hotspots. The thermal spreading layers may be formed from pyrolytic graphite strips, metal oxide-filled polymer composites, or thin metallic foils configured to maintain uniform heating along the evaporator length.

In certain embodiments, the longitudinal photothermal evaporator includes integrated alignment features configured to maintain the orientation of the nanoscroll population relative to the solar irradiation. These alignment features may include micro-grooved channels, patterned anchoring sites, or directional surface energy gradients that guide the placement of the nanoscrolls during fabrication. The alignment features may be distributed along the entire length of the evaporator to ensure consistent optical and thermal performance.

In certain embodiments, a thermal insulation layer is positioned beneath the photothermal layer to reduce conductive heat loss to underlying components. The thermal insulation layer may include an aerogel-based thermal barrier, a low-thermal-conductivity polymeric foam, or combinations thereof. Such materials may exhibit low density, high porosity, and reduced thermal conductivity, thereby maintaining a steep temperature gradient between the photothermal layer and the remainder of the system. In certain embodiments, the insulation layer is configured to support the photothermal layer while minimizing parasitic heat transfer to the microfluidic wicking lattice positioned below.

In certain embodiments, the microfluidic wicking lattice layer is positioned beneath the thermal insulation layer and is configured to deliver saltwater to the photothermal layer through capillary-driven transport. The wicking lattice may include interconnected microchannels, hydrophilic fibers, or patterned fluidic pathways that continuously supply water to the photothermal layer without requiring external pumping. In certain embodiments, the wicking lattice is engineered to maintain stable water delivery under varying salinity conditions and to prevent salt accumulation at the photothermal interface.

In certain embodiments, a vapor transport architecture is disposed above the photothermal layer and extends toward the first and second ends of the photothermal evaporator. The vapor transport architecture may include a plurality of microtransport channels dimensioned to receive water vapor generated at the photothermal layer during solar irradiation. These microtransport channels may be configured to guide, accelerate, and stabilize vapor flow along the evaporator's longitudinal axis. In certain embodiments, the vapor transport architecture includes transparent or semi-transparent structural elements that permit solar irradiation to reach the photothermal layer while simultaneously providing a controlled environment for vapor movement.

In certain embodiments, at least two condensers are positioned at the first and second ends of the photothermal evaporator and are fluidly connected to the vapor transport architecture. The condensers may be configured to receive vapor transported from the photothermal region and convert it into liquid water through controlled cooling. In certain embodiments, each condenser includes thermally conductive surfaces, micro-structured cooling features, or hydrophobic coatings that promote efficient droplet formation, coalescence, and collection. Placing condensers at opposite ends of the evaporator may create a longitudinal thermal gradient that enhances vapor flow and improves overall desalination efficiency.

Figure 1B:
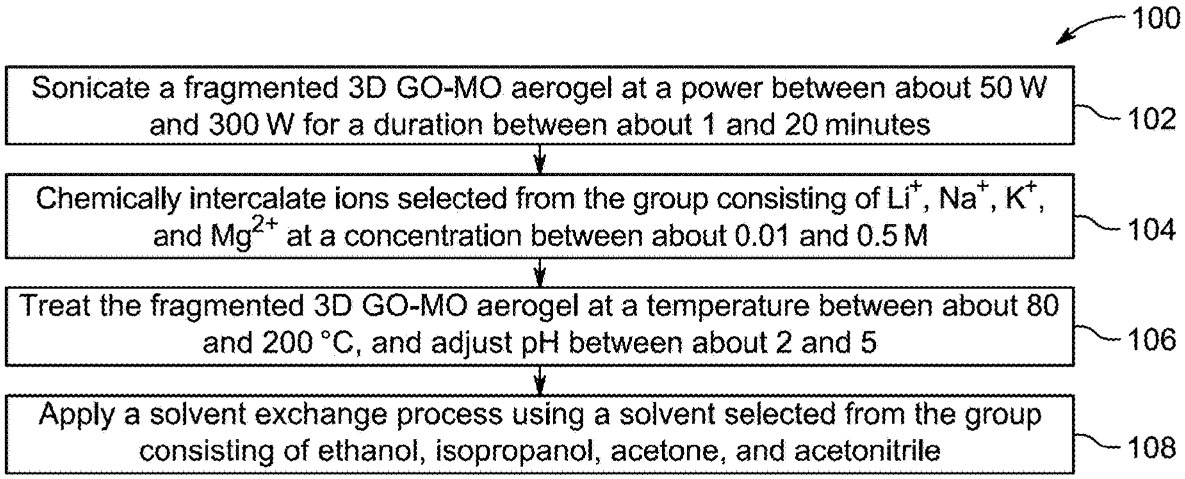
FIG. 1B is an exemplary flowchart of a method of scrolling stimulus, after the GO-MO aerogel is fragmented, according to certain embodiments.
Figure 1C:
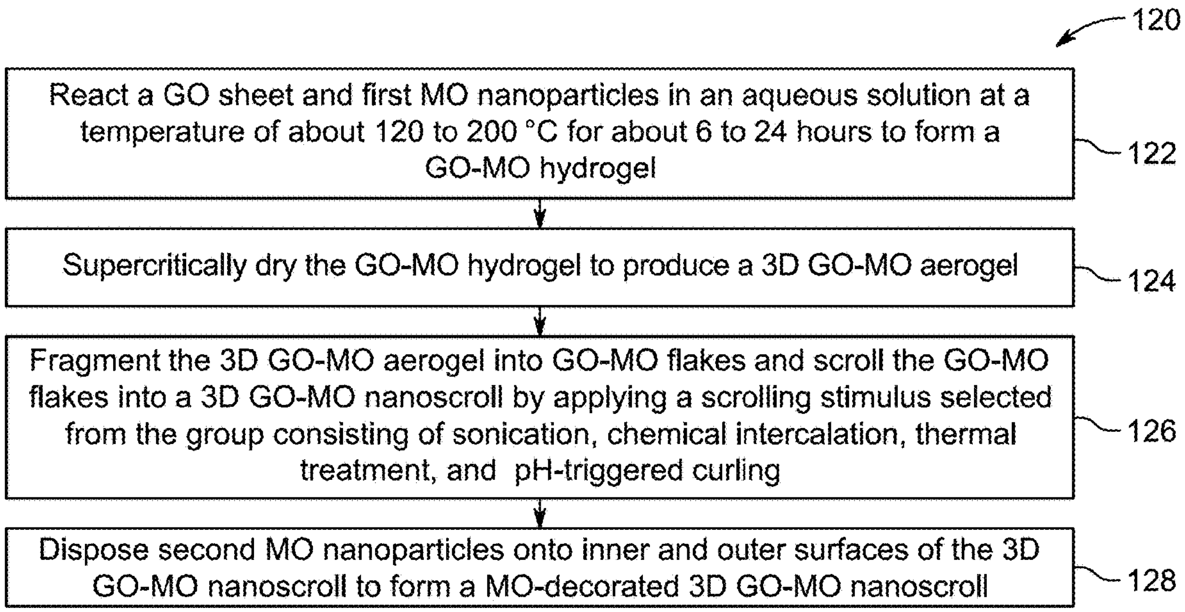
FIG. 1C is an exemplary flowchart of a method for producing a 3D GO-MO nanoscroll, according to certain embodiments.
Figure 1D:
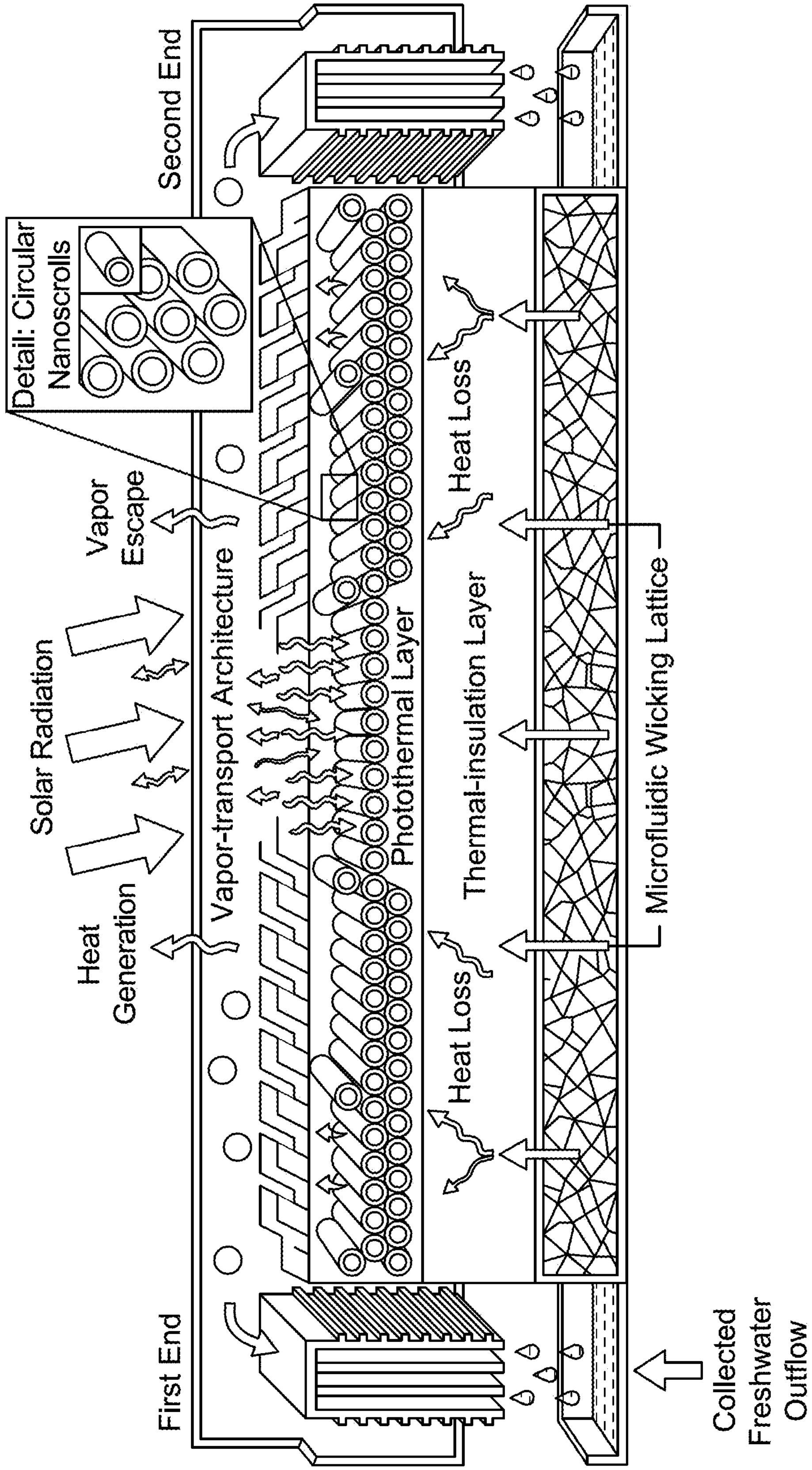
FIG. 1D is a schematic illustration of an advanced solar-driven desalination system, according to certain embodiments.

Referring to FIG. 1D is a schematic illustration of an advanced solar-driven desalination system, according to certain embodiments.

In certain embodiments, the photothermal layer comprises a hierarchical pore network configured to enhance water infiltration, light absorption, and vapor escape. The hierarchical pore network may include interconnected micro-, meso-, and nanoscale pores with average pore diameters between about 10 and 500 nm. In certain embodiments, the nanoscale pores facilitate rapid capillary-driven water transport into the interiors of the 3D GO-MO nanoscrolls, while the larger pores provide low-resistance vapor-release pathways that reduce vapor stagnation and improve overall evaporation flux.

In certain embodiments, the photothermal layer comprises patterned hydrophilic and hydrophobic surface regions. The hydrophilic regions may be configured to direct water infiltration toward the internal channels of the 3D GO-MO nanoscrolls, thereby ensuring continuous wetting of the scroll interiors during solar irradiation. The hydrophobic regions may be positioned on the outer surfaces of the nanoscrolls or on exposed planar regions of the photothermal layer to promote rapid vapor escape and minimize re-condensation at the photothermal interface. In certain embodiments, the hydrophilic-hydrophobic patterning is generated through chemical functionalization, plasma treatment, coating, or deposition of surface-energy-modifying materials.

In certain embodiments, the 3D GO-MO nanoscrolls within the photothermal layer are arranged in axially aligned arrays in which the scroll axes form an angle between about 10 and 45° relative to the direction of incoming solar irradiation. This angular orientation may increase the effective optical path length within the nanoscroll array, thereby enhancing broadband solar absorption through multiple internal reflections. In certain embodiments, the angled alignment also facilitates directional vapor escape by creating preferential vapor-flow channels between adjacent nanoscrolls.

In certain embodiments, the second metal-oxide (MO) nanoparticles are disposed on the 3D GO-MO nanoscrolls at a loading between about 5 and 40 wt. % relative to the total weight of the nanoscrolls. The nanoparticle loading may be determined to balance photothermal conversion efficiency, surface coverage, and vapor-generation performance. In certain embodiments, the nanoparticles are deposited through hydrothermal growth, chemical precipitation, atomic layer deposition, or solution-based adsorption techniques. The dual-surface decoration of the nanoscrolls may enhance localized photothermal heating, increase the density of active light-absorbing sites, and promote asymmetric thermal gradients that accelerate vapor generation from both the inner and outer scroll surfaces.

In certain embodiments, the photothermal layer comprises a hierarchical pore network having pore diameters between about 10 and 500 nm, preferably 10 and 100 nm, preferably 100 and 300 nm, and preferably 300 and 500 nm.

In certain embodiments, the 3D GO-MO nanoscrolls are arranged in axially aligned arrays in which the scroll axes form an angle between about 10 and 45°, preferably 10 and 20°, preferably 20 and 35°, and preferably 35 and 45°.

In certain embodiments, the second MO nanoparticles are disposed at a loading between about 5 and 40 wt. %, preferably 5 and 15 wt. %, preferably 15 and 25 wt. %, and preferably 25 and 40 wt. % relative to the total weight of the nanoscrolls.

In certain embodiments, the photothermal layer comprises a multilayered absorption interface engineered to maximize solar-thermal conversion under variable illumination angles. The photothermal layer may include a surface-textured absorption field configured to scatter incident light into the underlying nanoscroll population. The surface texture may include micro-corrugations, tapered ridges, hemispherical dimples, or quasi-random roughness patterns that increase the effective optical path length and reduce specular reflection. These features may be distributed across the photothermal layer in a longitudinal gradient to equalize irradiance and prevent localized overheating.

In certain embodiments, the photothermal layer includes an optical-impedance-matching region positioned above or adjacent to the nanoscroll array. This region may be formed from a thin dielectric coating, a nanoporous silica layer, or a refractive-index-graded polymer film configured to reduce Fresnel losses and enhance photon coupling into the nanoscroll interiors. The impedance-matching region may be engineered to maintain high transmittance across ultraviolet, visible, and near-infrared wavelengths.

In certain embodiments, the photothermal layer incorporates a thermal-localization substructure configured to confine heat within the nanoscroll population. This substructure may include low-conductivity interstitial domains, thermally resistive polymeric binders, or aerogel-derived micromatrices that reduce lateral heat dissipation. The thermal localization substructure may be patterned to create microscale thermal wells that concentrate heat at the scroll interfaces, thereby increasing vapor generation efficiency.

In certain embodiments, the photothermal layer includes a scroll-anchoring matrix configured to maintain the spatial distribution and orientation of the 3D GO-MO nanoscrolls. The anchoring matrix may be formed from a crosslinked polymer network, a sol-gel-derived oxide film, or a micropatterned adhesive layer that secures the nanoscrolls without obstructing their internal channels. The anchoring matrix may be deposited via spin-coating, spray deposition, inkjet printing, or meniscus-guided coating techniques.

In certain embodiments, the photothermal layer includes a water-redistribution interface positioned between the nanoscrolls and the underlying wicking lattice. This interface may include micro-bridges, capillary ridges, or hydrophilic conduits configured to distribute incoming water uniformly across the nanoscroll population. The water redistribution interface may prevent localized dry spots, maintain continuous wetting of the scroll interiors, and reduce salt crystallization at the photothermal boundary.

In certain embodiments, the photothermal layer incorporates a vapor-release architecture configured to minimize vapor backpressure and facilitate the rapid escape of generated vapor. This architecture may include micro-scale escape corridors, tapered vapor-release apertures, or vertically oriented diffusion channels positioned between clusters of nanoscrolls. The vapor-release architecture may be arranged in a periodic or quasi-random pattern to maintain uniform vapor flux across the photothermal surface.

In certain embodiments, the photothermal layer includes a structural reinforcement network configured to maintain mechanical integrity under thermal cycling, humidity fluctuations, and salt exposure. The reinforcement network may include carbon-fiber micro-tows, ceramic whiskers, or polymeric micro-ribs embedded within or beneath the nanoscroll matrix. The reinforcement network may prevent delamination, cracking, or deformation of the photothermal layer during long-term operation.

In certain embodiments, the photothermal layer includes an environmental-stability coating configured to protect the nanoscrolls from oxidation, UV degradation, or chemical attack. The coating may include ultrathin layers of alumina, silica, titanium oxide, or fluorinated polymers deposited via atomic layer deposition, plasma-enhanced chemical vapor deposition, or solution-based coating methods. The environmental stability coating may be sufficiently thin to preserve optical absorption while providing long-term durability.

In certain embodiments, the photothermal layer includes a modular assembly architecture that enables replacement, repair, or reconfiguration of the nanoscroll population. The modular architecture may include detachable photothermal tiles, interlocking micro-panels, or flexible photothermal sheets that can be inserted or removed without disturbing the underlying insulation or wicking layers. This modularity may facilitate maintenance, scalability, and field deployment in remote environments.

In certain embodiments, the photothermal layer is configured to operate under dynamic solar conditions and may include adaptive optical features such as thermochromic pigments, variable-emissivity coatings, or phase-change inclusions that modulate absorption or heat retention in response to temperature changes. These adaptive features may stabilize the photothermal layer's temperature profile and maintain consistent vapor-generation performance throughout the day.

In certain embodiments, the 3D GO-MO nanoscrolls incorporated into the photothermal layer exhibit a controlled helical geometry that enhances light absorption, water infiltration, and vapor-release dynamics. The nanoscrolls may be formed from graphene oxide sheets that undergo scrolling in response to chemical, thermal, or mechanical stimuli, resulting in a tubular or partially open helical structure. In certain embodiments, the nanoscrolls have a helical pitch between about 50 and 500 nm, which may be determined to optimize internal light trapping, multiple-reflection absorption, and thermal localization along the scroll axis. A smaller pitch may increase the density of helical turns and enhance photothermal conversion, while a larger pitch may facilitate vapor escape from the scroll interior.

In certain embodiments, the 3D GO-MO nanoscrolls exhibit a radially graded diameter distribution, wherein an inner-region population of nanoscrolls has scroll diameters between about 50 and 150 nm and an outer-region population has scroll diameters between about 150 and 500 nm. This radial gradient may be engineered to create a hierarchical optical environment in which smaller-diameter scrolls enhance near-field absorption and larger-diameter scrolls promote far-field scattering and vapor-release efficiency. In certain embodiments, the graded distribution also improves packing density and reduces vapor-flow resistance within the photothermal layer.

In certain embodiments, the 3D GO-MO nanoscrolls have a scroll-wall thickness of about 5 to 50 nm, which may correspond to a multilayer graphene oxide structure decorated with metal oxide nanoparticles. The scroll-wall thickness may influence mechanical flexibility, thermal conductivity, and the scroll's ability to maintain structural integrity during repeated wetting and drying cycles. In certain embodiments, thinner walls may enhance capillary infiltration, while thicker walls may improve mechanical robustness.

In certain embodiments, the 3D GO-MO nanoscrolls include an internal channel diameter between about 20 and 300 nm, defining a hollow core that serves as a capillary-driven water-transport pathway and a confined vapor-generation zone. The internal channel may facilitate rapid water infiltration into the scroll interior and provide a low-resistance pathway for vapor escape during solar irradiation. In certain embodiments, the internal channel diameter is determined to balance capillary pressure, water delivery rate, and vapor transport efficiency.

In certain embodiments, the 3D GO-MO nanoscrolls exhibit a lateral dimension between about 5 and 200 μm, which may correspond to their length. The lateral dimension may influence the overall aspect ratio, mechanical stability, and orientation behavior of the nanoscrolls within the photothermal layer. In certain embodiments, longer nanoscrolls may form aligned arrays that enhance directional vapor transport.

In certain embodiments, the 3D GO-MO nanoscrolls have an aspect ratio between about 10:1 and 200:1, which may contribute to anisotropic optical absorption and directional heat conduction. High-aspect-ratio nanoscrolls may align more readily under shear or deposition forces, enabling the formation of ordered arrays that improve photothermal performance.

In certain embodiments, the 3D GO-MO nanoscrolls exhibit helical curvature uniformity, defined by a longitudinal pitch deviation within about 5 to 20 nm between adjacent helical turns. This uniformity may be attained through controlled scrolling conditions and may ensure consistent optical and thermal behavior along the scroll length. In certain embodiments, reduced pitch deviation enhances the reproducibility of light-trapping effects and minimizes structural defects that could impede water infiltration or vapor release.

In certain embodiments, the 3D GO-MO nanoscrolls comprise a helical pitch between about 50 and 500 nm, preferably 50 and 150 nm, preferably 150 and 300 nm, and preferably 300 and 500 nm.

In certain embodiments, the 3D GO-MO nanoscrolls exhibit a radially graded diameter distribution in which an inner-region scroll diameter is between about 50 and 150 nm and an outer-region scroll diameter is between about 150 and 500 nm, preferably 150 and 300 nm, and preferably 300 and 500 nm.

In certain embodiments, the scroll-wall thickness is between about 5 and 50 nm, preferably 5 and 15 nm, preferably 15 and 30 nm, and preferably 30 and 50 nm.

In certain embodiments, the internal channel diameter is between about 20 and 300 nm, preferably 20 and 80 nm, preferably 80 and 180 nm, and preferably 180 and 300 nm.

In certain embodiments, the lateral dimension is between about 5 and 200 μm, preferably 5 and 50 μm, preferably 50 and 120 μm, and preferably 120 and 200 μm.

In certain embodiments, the aspect ratio is between about 10:1 and 200:1, preferably 10:1 and 40:1, preferably 40:1 and 100:1, and preferably 100:1 and 200:1.

In certain embodiments, the helical curvature uniformity exhibits a longitudinal pitch deviation between about 5 and 20 nm, preferably 5 and 10 nm, and preferably 10 and 20 nm.

In certain embodiments, the 3D GO-MO nanoscrolls comprise a multilayered graphene oxide framework in which the scrolling geometry produces a tunable combination of curvature-induced strain, interlayer spacing, and internal channel accessibility. The scrolling process may generate a gradient of mechanical tension across the sheet thickness, resulting in a stable helical configuration that maintains its morphology under repeated hydration-dehydration cycles. The curvature of the scroll may create localized regions of enhanced electronic density, thereby increasing the absorption of incident photons and improving photothermal conversion efficiency.

In certain embodiments, the 3D GO-MO nanoscrolls exhibit a heterogeneous distribution of oxygen-containing functional groups along their basal planes and edges. This distribution may influence the binding affinity between the first and second metal-oxide nanoparticles, thereby creating preferential nucleation sites for nanoparticle anchoring. Functional group heterogeneity may also modulate the hydrophilicity of the scroll interior, enabling rapid water infiltration while maintaining vapor-release pathways along the outer scroll surfaces.

In certain embodiments, the 3D GO-MO nanoscrolls include interlayer galleries formed between adjacent turns of the scroll. These galleries may serve as micro-scale thermal reservoirs that trap absorbed solar energy and redistribute heat along the scroll axis. The galleries may also act as vapor expansion chambers, reducing back pressure and facilitating rapid vapor escape. In certain embodiments, the interlayer galleries may be engineered through controlled reduction of graphene oxide, ion intercalation, or thermal annealing to tune the balance between mechanical rigidity and vapor-transport efficiency.

In certain embodiments, the 3D GO-MO nanoscrolls exhibit anisotropic optical behavior arising from their helical geometry. The curvature of the nanoscroll may induce multiple internal reflections, waveguiding effects, or near-field optical coupling between adjacent scroll turns. These optical phenomena may increase the effective absorption cross-section of each nanoscroll and enhance broadband solar harvesting. In certain embodiments, the scroll geometry may be optimized to support resonant absorption modes that amplify light-matter interactions within the scroll interior.

In certain embodiments, the 3D GO-MO nanoscrolls include a distributed network of metal-oxide anchoring sites that extend along both the inner and outer scroll surfaces. These anchoring sites may be formed through covalent bonding, electrostatic interactions, or coordination chemistry between the functional groups of graphene oxide and the first MO nanoparticles. The anchoring network may stabilize the nanoparticles against detachment during thermal cycling and may create localized photothermal hotspots that accelerate vapor generation.

In certain embodiments, the 3D GO-MO nanoscrolls exhibit a hierarchical mechanical response in which the outer scroll layers provide structural rigidity, while the inner layers remain flexible and accommodate thermal expansion. This hierarchical response may prevent mechanical fatigue, delamination, or fracture of the scroll during long-term operation. The mechanical resilience of the nanoscrolls may be further enhanced by the presence of metal-oxide nanoparticles that act as nanoscale reinforcement nodes.

In certain embodiments, the 3D GO-MO nanoscrolls include a surface-energy gradient extending from the scroll interior to the scroll exterior. This gradient may be engineered through chemical functionalization, differential reduction of graphene oxide, or asymmetric nanoparticle deposition. The surface-energy gradient may promote directional water infiltration into the scroll interior and preferential vapor release from the scroll exterior, thereby improving evaporation efficiency.

In certain embodiments, the 3D GO-MO nanoscrolls are fabricated through a controlled scrolling process that produces a narrow distribution of helical geometries across the nanoscroll population. The scrolling process may be influenced by sheet thickness, lateral dimension, defect density, and the spatial distribution of metal-oxide nanoparticles. By tuning these parameters, the system may yield a uniform population of nanoscrolls with consistent optical, thermal, and mechanical properties.

In certain embodiments, the 3D GO-MO nanoscrolls are integrated into the photothermal layer through a directed-assembly process that aligns the scroll axes along a predetermined orientation. The directed assembly process may involve shear-induced alignment, electric-field alignment, magnetic-field alignment (for magnetic MO nanoparticles), or surface-energy-guided alignment. This orientation control may enhance the optical path length, improve vapor-release uniformity, and increase the system's overall photothermal efficiency.

In certain embodiments, the second MO nanoparticles are disposed on both the inner and outer surfaces of the 3D GO-MO nanoscrolls to enhance photothermal absorption, interfacial heat localization, and vapor generation efficiency. The dual-surface decoration may be attained through solution-phase deposition, hydrothermal growth, chemical precipitation, atomic layer deposition, or other nanoscale coating techniques capable of conformally coating the curved scroll surfaces.

In certain embodiments, the second MO nanoparticles disposed on the inner surfaces of the nanoscrolls have an average diameter between about 2 and 10 nm. Nanoparticles in this size range may penetrate the confined internal channels of the nanoscrolls and form high-surface-area catalytic and photothermal sites. The small particle size may also promote strong quantum-confinement effects, enhanced light absorption, and rapid thermal response within the scroll interior. In certain embodiments, the inner-surface nanoparticles may be anchored to oxygen-containing functional groups on the graphene oxide walls, enabling stable attachment during repeated wetting and drying cycles.

In certain embodiments, the second MO nanoparticles disposed on the outer surfaces of the nanoscrolls have an average diameter between about 10 and 50 nm. Larger nanoparticles on the outer surfaces may increase far-field scattering, broaden the absorption spectrum, and enhance photothermal conversion across visible and near-infrared wavelengths. In certain embodiments, the larger outer-surface nanoparticles may also serve as thermal hotspots that accelerate vapor generation at the scroll exterior.

In certain embodiments, the second MO nanoparticles are deposited with an axial surface-density gradient between about $10^9$ and $10^{12}$ particles $cm^{-2}$. This gradient may be engineered to create directional thermal fields along the scroll axis, thereby promoting asymmetric vapor release and enhancing longitudinal vapor transport. In certain embodiments, the gradient may be attained through controlled precursor concentration, flow-assisted deposition, or spatial nucleation along the scroll length.

In certain embodiments, at least a portion of the second MO nanoparticles forms nanoscale clusters with average diameters between about 5 and 100 nm. These clusters may arise from partial aggregation during deposition or from intentional cluster growth processes. In certain embodiments, nanoparticle clusters may create localized photothermal hotspots, increase multi-photon absorption, and enhance interfacial heat transfer to the surrounding water film. The presence of clusters may also broaden the optical absorption profile and improve overall photothermal efficiency.

In certain embodiments, the second MO nanoparticles are selected from the group consisting of molybdenum disulfide ($MoS_2$), vanadium oxide ($V_2O_5$), silver vanadate ($AgVO_3$), copper oxide (CuO), cobalt oxide ($Co_3O_4$), tungsten oxide ($WO_3$), and nickel oxide (NiO). These materials may be chosen for their strong broadband absorption, high photothermal conversion efficiency, catalytic activity, or ability to form stable nanoscale interfaces with graphene-oxide surfaces. In certain embodiments, the selected metal oxides may also exhibit favorable bandgap energies, enabling efficient light-to-heat conversion under natural sunlight.

In certain embodiments, the second MO nanoparticles disposed on the inner surfaces of the nanoscrolls have an average diameter between about 2 and 10 nm, preferably 2 and 5 nm, and preferably 5 and 10 nm.

In certain embodiments, the nanoparticles disposed on the outer surfaces have an average diameter between about 10 and 50 nm, preferably 10 and 25 nm, and preferably 25 and 50 nm.

In certain embodiments, the axial surface-density gradient is between about $10^9$ and $10^{12}$ particles $cm^{-2}$, preferably $10^9$ and $10^{10}$ particles $cm^{-2}$, preferably $10^{10}$ and $10^{11}$ particles $cm^{-2}$, and preferably $10^{11}$ and $10^{12}$ particles $cm^{-2}$.

In certain embodiments, at least a portion of the nanoparticles forms nanoscale clusters having an average diameter between about 5 and 100 nm, preferably 5 and 30 nm, preferably 30 and 60 nm, and preferably 60 and 100 nm.

In certain embodiments, the second MO nanoparticles serve as multifunctional photothermal, catalytic, and interfacial-engineering agents that enhance the performance of the 3D GO-MO nanoscrolls. The nanoparticles may be selected to exhibit strong absorption across ultraviolet, visible, and near-infrared wavelengths, thereby increasing the density of localized photothermal hotspots along both the inner and outer scroll surfaces. In certain embodiments, the nanoparticles possess band-gaps, defect states, or plasmonic resonances that complement the intrinsic absorption spectrum of the graphene oxide framework.

In certain embodiments, the second MO nanoparticles exhibit controlled crystallinity and facet exposure that influence their optical and thermal behavior. Nanoparticles with high-index facets may generate enhanced electromagnetic field localization under solar irradiation, while nanoparticles with oxygen-vacancy-rich surfaces may exhibit increased photothermal conversion efficiency. The crystallographic orientation of the nanoparticles may be tuned through precursor selection, reaction temperature, or post-synthetic annealing to optimize their interaction with incident light.

In certain embodiments, the second MO nanoparticles include surface-bound hydroxyl groups, oxygen vacancies, or coordinatively unsaturated metal sites that promote strong interfacial bonding with the graphene oxide substrate. These interfacial interactions may stabilize the nanoparticles against detachment during thermal cycling and may create hybrid electronic states that enhance charge transfer between the nanoparticles and the underlying carbon lattice. The resulting hybridization may increase the rate of non-radiative relaxation processes, thereby improving photothermal heat generation.

In certain embodiments, the second MO nanoparticles exhibit a tailored size distribution that balances surface area, optical absorption, and thermal stability. Smaller nanoparticles may penetrate deeper into the scroll interior and create distributed heating zones, while larger nanoparticles may form surface-exposed clusters that act as macroscopic photothermal antennas. The combination of multiple nanoparticle size regimes may produce a hierarchical heating profile that accelerates water vaporization across the entire scroll structure.

In certain embodiments, the second MO nanoparticles are engineered to modulate the hydrophilicity or hydrophobicity of the scroll surfaces. Nanoparticles with hydrophilic surface terminations may enhance water infiltration into the scroll interior, while nanoparticles with hydrophobic terminations may promote rapid vapor escape from the scroll exterior. This asymmetric surface energy modulation may create directional pathways for water vapor transport, thereby improving evaporation efficiency.

In certain embodiments, the second MO nanoparticles exhibit catalytic activity that facilitates water dissociation or accelerates vapor-nucleation formation. Nanoparticles such as $Co_3O_4$, NiO, or $WO_3$ may promote localized water activation, thereby reducing the energy barrier for vapor generation. This catalytic effect may be particularly beneficial under low-irradiance conditions or during transient cloud cover, enabling the system to maintain stable evaporation rates.

In certain embodiments, the second MO nanoparticles are deposited through a controlled nucleation-and-growth process that produces uniform coverage along the scroll surfaces. The deposition process may involve solution-phase adsorption, ligand-assisted anchoring, vapor-phase infiltration, or electrostatic assembly. By tuning precursor concentration, pH, ionic strength, or solvent polarity, the system may attain deposition on either the inner or outer scroll surfaces, thereby enabling spatially resolved photothermal functionality.

In certain embodiments, the second MO nanoparticles are incorporated into the nanoscrolls through a multi-step assembly process that includes precursor infiltration, in situ nucleation, and post-growth stabilization. During precursor infiltration, metal salt ions may diffuse into the scroll interior and bind to oxygen-containing functional groups. Subsequent thermal or chemical activation may convert the bound precursors into crystalline nanoparticles that remain anchored within the scroll architecture.

In certain embodiments, the second MO nanoparticles exhibit synergistic interactions with the first MO nanoparticles embedded within the graphene-oxide sheet. These interactions may include charge transfer, phonon coupling, or thermal field overlap that enhance the overall photothermal response of the composite. The dual-MO configuration may create a multi-modal absorption profile that captures a broader portion of the solar spectrum and increases the total heat flux delivered to the water interface.

In certain embodiments, the second MO nanoparticles are arranged in spatially periodic or quasi-random patterns along the scroll surfaces. Periodic arrangements may create photonic or plasmonic coupling effects that enhance light trapping, while quasi-random arrangements may reduce coherent scattering losses and increase broadband absorption. The spatial distribution may be controlled through templated deposition, patterned functionalization, or directed self-assembly.

In certain embodiments, the second MO nanoparticles include protective surface coatings or passivation layers that improve their chemical stability in saline environments. These coatings may include ultrathin oxide shells, polymeric ligands, or fluorinated surface treatments that inhibit dissolution, aggregation, or surface fouling. The protective layers may be thin to preserve optical absorption while providing long-term operational durability.

In certain embodiments, the thermal insulation layer positioned beneath the photothermal layer comprises an engineered anisotropic thermal-conductivity profile configured to minimize downward heat loss while maintaining lateral thermal spreading within the photothermal evaporator. In certain embodiments, the insulation layer exhibits an in-plane thermal conductivity at least twice the through-plane thermal conductivity, thereby enabling heat to remain concentrated near the photothermal interface while preventing thermal leakage into the microfluidic wicking lattice. This anisotropy may be generated through directional pore alignment, layered composite structures, or incorporation of thermally resistive polymeric domains.

In certain embodiments, the thermal insulation layer further comprises a plurality of radiative-reflective microdomains embedded within the insulating matrix. These microdomains may include silica microspheres, hollow glass particles, alumina platelets, or combinations thereof. Such microdomains may be configured to reflect infrared radiation back toward the photothermal layer, thereby enhancing thermal confinement and reducing radiative heat loss. In certain embodiments, the size, distribution, and volume fraction of the microdomains are determined to maximize scattering efficiency while maintaining low bulk density.

In certain embodiments, the thermal insulation layer includes surface-specific wettability treatments to improve mechanical integration with adjacent layers and to prevent undesired water infiltration. The upper surface of the insulation layer may comprise a hydrophobic coating, which may inhibit downward migration of liquid water from the photothermal layer and prevent moisture-induced degradation of the insulation material. In certain embodiments, the hydrophobic coating may be formed from fluorinated silanes, hydrophobic polymers, or plasma-deposited low-surface-energy films. The lower surface of the insulation layer may comprise a hydrophilic coating, which may improve adhesion to the microfluidic wicking lattice and promote stable mechanical coupling during thermal cycling.

In certain embodiments, the thermal insulation layer comprises a plurality of embedded microvoid channels dimensioned to trap stagnant air and stabilize a vertical thermal gradient between the photothermal layer and the microfluidic wicking lattice. These microvoid channels may have average dimensions determined to suppress convective air movement while maintaining structural integrity. In certain embodiments, the microvoid channels may be formed through templated foaming, freeze-casting, phase separation, or additive manufacturing techniques. The trapped air within the microvoids may serve as an additional thermal barrier, further reducing conductive and convective heat transfer.

In certain embodiments, the radiative-reflective microdomains are present at volume fractions between about 1 and 20 vol. %, preferably 1 and 5 vol. %, preferably 5 and 12 vol. %, and preferably 12 and 20 vol. %.

In certain embodiments, the embedded microvoid channels have an average diameter between about 10 and 300 μm, preferably 10 and 80 μm, preferably 80 and 180 μm, and preferably 180 and 300 μm.

In certain embodiments, the thermal insulation layer comprises a multilayer thermal-barrier architecture engineered to confine heat within the photothermal region while minimizing conductive, convective, and radiative losses to the underlying components. The insulation layer may include a stratified arrangement of low-density materials configured to create a sequence of thermal-resistance interfaces that impede downward heat flow. These stratified layers may include aerogel-derived microstructures, polymeric foams, or porous ceramic films arranged to maximize phonon scattering and reduce effective thermal conductivity.

In certain embodiments, the thermal insulation layer incorporates a gradient-porosity design in which the upper region exhibits smaller pore sizes to suppress convective heat transfer, while the lower region exhibits larger pore sizes to reduce material density and minimize thermal mass. This gradient-porosity design may be fabricated through freeze-casting, directional foaming, or solvent-evaporation templating techniques that create vertically aligned pore channels with controlled dimensions.

In certain embodiments, the insulation layer includes a thermal-reflective sublayer positioned immediately beneath the photothermal layer. This sublayer may include thin metallic coatings, oxide-based reflective films, or embedded micro-flakes of aluminum, titanium dioxide, or boron nitride configured to reflect downward-propagating infrared radiation back toward the photothermal interface. The reflective sublayer may increase the effective optical absorption of the photothermal layer by recycling radiative energy that would otherwise be lost.

In certain embodiments, the thermal insulation layer includes a moisture-management interface configured to prevent water intrusion into the insulation matrix. This interface may include hydrophobic surface treatments, vapor-permeable barrier films, or micro-textured drainage pathways that divert infiltrating water away from the insulation layer. The moisture-management interface may preserve the low thermal conductivity of the insulation layer by preventing pore flooding and maintaining air-filled voids.

In certain embodiments, the insulation layer incorporates a mechanical stabilization framework configured to maintain structural integrity under compressive loads imposed by the photothermal layer and the vapor-transport architecture. The stabilization framework may include polymeric micro-ribs, ceramic whiskers, or carbon-fiber micro-struts embedded within the insulation matrix. These reinforcement elements may prevent compaction, deformation, or creep of the insulation layer during long-term operation.

In certain embodiments, the thermal insulation layer includes a lateral heat-spreading substructure configured to equalize the temperature distribution across the photothermal layer. This substructure may include thin strips of pyrolytic graphite, metal-oxide-filled polymer films, or anisotropic carbon sheets embedded within the upper region of the insulation layer. The lateral-heat-spreading substructure may reduce thermal hotspots and maintain uniform evaporation rates across the photothermal surface.

In certain embodiments, the insulation layer includes a salt-isolation barrier positioned between the insulation and the microfluidic wicking lattice. This barrier may include hydrophobic membranes, ion-repelling coatings, or micro-structured salt-diversion channels configured to prevent salt crystallization within the insulation matrix. The salt isolation barrier may extend across the entire footprint of the insulation layer to ensure long-term thermal stability.

In certain embodiments, the thermal insulation layer incorporates a compressible compliance zone configured to accommodate thermal expansion of the photothermal layer during solar heating. The compliance zone may include elastomeric foams, viscoelastic polymer films, or micro-corrugated structures that deform under thermal stress and prevent delamination between layers.

In certain embodiments, the microfluidic wicking lattice comprises a plurality of interconnected microchannels configured to deliver saltwater from the bulk reservoir to the photothermal layer through passive, capillary-driven transport. The microchannels may be arranged in helical patterns, orthogonal grid geometries, radial-spoke configurations, or combinations thereof. In certain embodiments, a helical pattern may enhance longitudinal water transport and distribute water uniformly beneath the photothermal layer, while an orthogonal grid may provide isotropic wicking behavior and structural stability. A radial-spoke geometry may be used to direct water toward central or peripheral regions of the photothermal layer, depending on the desired evaporation profile.

In certain embodiments, the microfluidic wicking lattice further comprises a lateral diffusion pathway configured to divert accumulated salt ions away from the thermal insulation layer and the photothermal layer. The lateral diffusion pathway may include widened microchannel segments, ion-permeable fiber bundles, or low-resistance diffusion corridors that promote the migration of concentrated brine toward discharge regions. In certain embodiments, the lateral diffusion pathway reduces salt crystallization at the photothermal interface and maintains long-term desalination performance under high-salinity operation.

In certain embodiments, the microfluidic wicking lattice includes a network of hydrophilic fibers selected from polyvinyl alcohol (PVA) fibers, cellulose-based plant fibers, or cotton microbundles. These fibers may be embedded within or interwoven through the microchannel network to enhance capillary rise, increase water-retention capacity, and stabilize the wicking structure during repeated wetting and drying cycles. In certain embodiments, the fibers may be arranged in aligned, random, or layered configurations to tailor water-transport anisotropy and mechanical flexibility.

In certain embodiments, each hydrophilic fiber has a surface energy between about 40 and 75 $mN\cdot m^{-1}$, which may be determined to maintain continuous capillary flow under salinity levels up to about 20 wt. % relative to the total weight of the saltwater. Surface energies within this range may ensure strong water-fiber interactions, rapid wetting, and stable water films even at high ionic strength. In certain embodiments, the surface energy may be tuned through chemical modification, plasma treatment, or incorporation of hydrophilic functional groups.

In certain embodiments, the interconnected microchannels of the wicking lattice exhibit average widths between about 20 and 500 μm, preferably 20 and 100 μm, preferably 100 and 250 μm, and preferably 250 and 500 μm.

In certain embodiments, the lateral diffusion pathway has a width between about 50 and 800 μm, preferably 50 and 200 μm, preferably 200 and 450 μm, and preferably 450 and 800 μm.

In certain embodiments, the hydrophilic fibers exhibit a surface energy between about 40 and 75 $mN\cdot m^{-1}$, preferably 40 and 55 $mN\cdot m^{-1}$, and preferably 55 and 75 $mN\cdot m^{-1}$, enabling continuous capillary flow under salinity levels between about 5 and 20 wt. %, preferably 5 and 12 wt. %, and preferably 12 and 20 wt % relative to the total weight of the saltwater.

In certain embodiments, the microfluidic wicking lattice layer comprises a capillary-active transport network engineered to deliver saltwater uniformly to the photothermal layer under passive, pump-free operation. The lattice may include a patterned arrangement of microchannels, fiber bundles, and porous conduits configured to maintain continuous water flow even under fluctuating salinity, temperature, and hydrostatic pressure conditions. The geometry of the lattice may be determined to balance rapid water replenishment with controlled flow resistance, thereby preventing oversaturation of the photothermal interface.

In certain embodiments, the wicking lattice includes a hierarchical capillary pressure distribution in which smaller-diameter channels generate high capillary suction to draw water upward, while larger-diameter channels act as low-resistance conduits for lateral redistribution. This hierarchical arrangement may prevent localized dry zones and ensure that water is delivered evenly across the photothermal layer's entire footprint. The capillary hierarchy may be fabricated through multi-scale templating, fiber-weaving, or additive manufacturing techniques.

In certain embodiments, the microfluidic wicking lattice incorporates a directional-flow architecture configured to promote upward water transport while suppressing downward backflow. This architecture may include asymmetric channel cross-sections, tapered conduits, or surface-energy gradients that create preferential flow pathways. The directional flow architecture may also reduce salt back-diffusion into the lower regions of the system, thereby improving long-term operational stability.

In certain embodiments, the wicking lattice includes a fiber-anchoring matrix configured to immobilize hydrophilic fibers within the microchannel network. The anchoring matrix may be formed from a crosslinked polymer binder, a sol-gel-derived oxide film, or a micro-patterned adhesive layer that secures the fibers without obstructing capillary flow. The anchoring matrix may also enhance mechanical durability by preventing fiber displacement during thermal cycling or mechanical vibration.

In certain embodiments, the microfluidic wicking lattice includes a salinity-buffering interface positioned at the boundary between the lattice and the underlying water reservoir. This interface may include ion membranes, salt-repelling coatings, or micro-structured diffusion barriers configured to reduce the upward migration of salt crystals. The salinity-buffering interface may maintain stable capillary performance even as reservoir salinity increases during extended operation.

In certain embodiments, the wicking lattice incorporates a thermal-decoupling sublayer configured to isolate the water reservoir from the elevated temperatures of the photothermal layer. This sublayer may include low-conductivity polymer films, aerogel-derived microstructures, or porous ceramic sheets that reduce conductive heat transfer. The thermal-decoupling sublayer may prevent premature heating of the incoming water, thereby maintaining strong capillary suction and reducing evaporative losses within the lattice.

In certain embodiments, the microfluidic wicking lattice includes a self-cleaning architecture configured to mitigate salt accumulation within the microchannels. This architecture may include hydrophobic bypass corridors, micro-scale drainage grooves, or alternating wet-dry cycling zones that promote dissolution and removal of salt deposits. The self-cleaning architecture may extend the system's operational lifetime by preventing pore blockage and maintaining consistent water delivery.

In certain embodiments, the wicking lattice includes a surface-energy-tuned coating applied to the interior walls of the microchannels. This coating may include hydrophilic polymers, oxygen-plasma-treated surfaces, or metal-oxide nanofilms that enhance water spreading and reduce contact-angle hysteresis. The surface-energy-tuned coating may maintain strong capillary performance even after prolonged exposure to saline water.

In certain embodiments, the microfluidic wicking lattice is fabricated through a multi-step manufacturing process that includes channel patterning, fiber placement, surface-energy modification, and structural curing. Channel patterning may be attained through laser micromachining, soft lithography, or mold-based embossing. Fiber placement may be performed through weaving, electrospinning, or guided deposition. Surface energy modification may include chemical grafting, plasma treatment, or thin-film deposition.

In certain embodiments, the vapor transport architecture comprises a transparent membrane positioned above the photothermal layer and configured to permit solar irradiation to reach the underlying nanostructured absorber while simultaneously shaping, stabilizing, and directing the flow of water vapor generated during operation. In certain embodiments, the transparent membrane is positioned between about 5 and 15 mm above the photothermal layer, a spacing determined to balance optical transmission, vapor-flow confinement, and suppression of turbulence. The membrane may further exhibit a curvature radius of about 20 to 150 mm, which may be engineered to promote radial vapor spreading, reduce droplet coalescence within the membrane, and maintain laminar vapor transport toward the evaporator's first and second ends.

In certain embodiments, the transparent membrane is formed from borosilicate glass, fused silica, polycarbonate, polyethylene terephthalate (PET), or fluorinated ethylene propylene (FEP). These materials may be selected for their high optical transmittance, low absorption in the solar spectrum, mechanical stability, and resistance to thermal cycling. In certain embodiments, polymeric membranes such as PET or FEP may provide enhanced flexibility and reduced weight, while glass-based membranes may offer superior thermal stability and scratch resistance.

In certain embodiments, the interior surfaces of the transparent membrane comprise a hydrophobic coating selected from fluorinated silane coatings, perfluoropolyether coatings, or polytetrafluoroethylene-based coatings. These hydrophobic coatings may reduce droplet adhesion, suppress fogging, and prevent condensate accumulation within the membrane. In certain embodiments, the hydrophobic surface treatment promotes rapid droplet shedding, thereby maintaining optical clarity and minimizing vapor-flow obstruction during operation.

In certain embodiments, the vapor transport architecture further comprises a support frame configured to maintain the transparent membrane's position, curvature, and thermal environment. The support frame may be formed from aluminum, copper, anisotropic pyrolytic graphite, or thermally conductive polymer composites, materials selected for their ability to conduct heat efficiently and maintain structural rigidity. In certain embodiments, the support frame is engineered to establish and preserve a longitudinal thermal gradient extending from the central region of the photothermal evaporator toward the first and second ends. This thermal gradient may drive directional vapor transport toward the condensers.

In certain embodiments, the support frame is additionally configured to maintain a radial thermal gradient extending away from the photothermal layer. This radial gradient may reduce vapor stagnation near the membrane center, promote outward vapor spreading, and enhance the overall throughput of the vapor transport architecture. In certain embodiments, the combination of longitudinal and radial thermal gradients creates a multidirectional vapor flow field that increases vapor velocity, reduces back diffusion, and improves condensation efficiency at the system boundaries.

In certain embodiments, the transparent membrane has a curvature radius between about 20 and 150 mm, preferably 20 and 60 mm, preferably 60 and 100 mm, and preferably 100 and 150 mm.

In certain embodiments, the membrane is positioned between about 5 and 15 mm above the photothermal layer, preferably 5 and 8 mm, preferably 8 and 12 mm, and preferably 12 and 15 mm.

In certain embodiments, the hydrophobic interior coating exhibits a water-contact angle between about 100 and 150°, preferably 100 and 120°, and preferably 120 and 150°.

In certain embodiments, the support frame maintains a longitudinal thermal gradient between about 2 and 15° C., preferably 2 and 6° C., preferably 6 and 10° C., and preferably 10 and 15° C., and a radial thermal gradient between about 1 and 8° C., preferably 1 and 4° C., and preferably 4 and 8° C.

In certain embodiments, the vapor transport architecture comprises a multi-component flow management assembly engineered to guide, accelerate, and stabilize water vapor as it travels from the photothermal layer toward the condensers. The architecture may include a combination of curved surfaces, micro-engineered channels, and thermally regulated structural elements configured to maintain laminar vapor flow and to suppress turbulence, droplet coalescence, and back diffusion.

In certain embodiments, the vapor transport architecture includes a vaulted or domed upper contour configured to create a pressure-relief zone above the photothermal layer. This contour may be shaped to promote upward vapor expansion followed by axial redirection toward the first and second ends of the evaporator. The curvature may be determined to minimize stagnation points and to maintain a continuous axial pressure gradient that enhances vapor throughput.

In certain embodiments, the vapor transport architecture incorporates a multi-zone flow-conditioning region positioned immediately above the photothermal surface. This region may include microtextured surfaces, shallow riblets, or aerodynamic ridges configured to align vapor streamlines and reduce boundary layer separation. The flow-conditioning region may also suppress droplet formation by reducing local supersaturation and promoting rapid vapor evacuation.

In certain embodiments, the vapor transport architecture includes a thermal-regulation framework configured to maintain a controlled temperature distribution along the vapor pathway. This framework may include thermally conductive ribs, heat-spreading plates, or embedded phase-change inclusions that modulate local temperature gradients. By maintaining a slightly elevated temperature near the photothermal interface and a cooler temperature near the condensers, the thermal-regulation framework may enhance directional vapor pumping.

In certain embodiments, the vapor transport architecture incorporates an optical transmission zone configured to maximize the solar irradiance reaching the photothermal layer. This zone may include antireflective coatings, refractive-index-graded films, or microlens arrays that reduce optical losses and improve the focusing of light onto the nanoscroll population. The optical transmission zone may be engineered to maintain high transmittance even at oblique illumination angles.

In certain embodiments, the vapor transport architecture includes a droplet-management subsystem configured to prevent condensate accumulation within the vapor pathway. This subsystem may include hydrophobic drainage ridges, micro-scale gutter channels, or directional wetting patterns that divert droplets away from the primary vapor stream. The droplet-management subsystem may also include localized heating elements or thermally conductive patches that evaporate residual droplets before they obstruct flow.

In certain embodiments, the vapor transport architecture includes a distributed pressure-equalization network configured to maintain uniform vapor pressure along the longitudinal axis. This network may include microperforations, bypass corridors, or pressure-relief apertures that prevent localized over-pressurization and ensure stable vapor flow. The pressure-equalization network may also reduce the risk of vapor backflow into the wicking lattice.

In certain embodiments, the vapor transport architecture incorporates a structural-reinforcement skeleton configured to maintain the spacing between the transparent membrane and the photothermal layer. The skeleton may include lightweight trusses, micropillars, or ribbed support beams made of thermally stable materials. The reinforcement skeleton may prevent membrane sagging, deformation, or collapse under thermal cycling or mechanical stress.

In certain embodiments, the vapor transport architecture includes an environmental shielding layer configured to protect the internal vapor pathway from dust, aerosols, or other airborne contaminants. This shielding layer may include electrostatic filters, micro-mesh screens, or hydrophobic dust-repellent coatings that preserve optical clarity and prevent fouling of the microtransport channels.

In certain embodiments, the vapor transport architecture includes a dynamic flow adaptation mechanism configured to adjust the effective cross-sectional area of the vapor pathway in response to environmental conditions. This mechanism may include flexible membranes, thermally responsive polymers, or mechanically actuated shutters that expand or contract the vapor channel to maintain favorable flow rates under varying solar intensities.

In certain embodiments, the vapor transport architecture comprises a plurality of microtransport channels engineered to guide, accelerate, and stabilize the movement of water vapor generated at the photothermal layer. The microtransport channels may be fabricated within or supported by the transparent membrane, a micro-structured substrate, or a thermally conductive frame. Their geometry, internal features, and dimensional parameters may be determined to maintain laminar flow, reduce vapor stagnation, and enhance longitudinal vapor throughput toward the first and second ends of the photothermal evaporator.

In certain embodiments, each microtransport channel includes a variable-diameter segment with a constricted throat region configured to increase vapor velocity via Venturi-type acceleration. The throat region may have a diameter between about 20 and 150 μm, while the upstream and downstream channel sections may have larger diameters to maintain a stable pressure gradient. In certain embodiments, the constricted throat region generates a localized reduction in static pressure, thereby sustaining a longitudinal pressure gradient that drives vapor flow toward the condensers positioned at the ends of the evaporator. This geometry may also suppress back-diffusion of vapor and reduce turbulence within the channel.

In certain embodiments, the microtransport channels further comprise a micropillar lattice disposed along the channel interior. The micropillar lattice may include a plurality of micropillars having heights between about 20 and 200 μm and center-to-center spacing between about 30 and 300 μm. The micropillars may be cylindrical, conical, hexagonal, or prismatic. In certain embodiments, the micropillar lattice stabilizes laminar flow by disrupting vortex formation, reducing shear-layer instabilities, and maintaining uniform vapor velocity profiles across the channel cross-section. The micropillars may also serve as structural supports that prevent channel collapse under thermal or mechanical stress.

In certain embodiments, the interior wall of each microtransport channel comprises a plurality of condensate-bypass grooves dimensioned to divert condensed droplets away from the primary vapor-flow pathway. The grooves may be longitudinal, helical, or angled relative to the channel axis and may exhibit groove aspect ratios between about 2 and 10. In certain embodiments, the grooves provide low-resistance drainage pathways that prevent droplet accumulation, reduce flow blockage, and maintain high vapor transport efficiency even under fluctuating humidity conditions. The grooves may also promote droplet coalescence and directional movement toward drainage regions or condensate-collection structures.

In certain embodiments, the microtransport channels have a hydraulic diameter between about 50 and 500 μm and a channel length between about 2 and 50 mm. These dimensions may be determined to balance vapor-flow resistance, pressure-drop characteristics, and manufacturability. In certain embodiments, shorter channels may be used in compact evaporator designs, while longer channels may be employed to enhance directional vapor transport in elongated architectures.

In certain embodiments, the microtransport channels have a hydraulic diameter between about 50 and 500 μm, preferably 50 and 150 μm, preferably 150 and 300 μm, and preferably 300 and 500 μm.

In certain embodiments, the throat-region diameter is between about 20 and 150 μm, preferably 20 and 60 μm, preferably 60 and 100 μm, and preferably 100 and 150 μm.

In certain embodiments, the channel length is between about 2 and 50 mm, preferably 2 and 10 mm, preferably 10 and 25 mm, and preferably 25 and 50 mm.

In certain embodiments, the micropillars have a height between about 20 and 200 μm, preferably 20 and 80 μm, preferably 80 and 140 μm, and preferably 140 and 200 μm, and a center-to-center spacing between about 30 and 300 μm, preferably 30 and 100 μm, preferably 100 and 200 μm, and preferably 200 and 300 μm.

In certain embodiments, the condensate-bypass grooves exhibit an aspect ratio between about 2 and 10, preferably 2 and 5, and preferably 5 and 10.

In certain embodiments, the microtransport channels comprise a network of engineered vapor-flow conduits configured to guide water vapor from the photothermal layer toward the condensers with minimal pressure loss. The channels may be arranged in a longitudinal array that spans the length of the evaporator, thereby establishing a directional vapor transport corridor that enhances throughput and reduces vapor stagnation. The geometry of the channels may be determined to maintain laminar flow across a wide range of vapor-generation rates.

In certain embodiments, the microtransport channels include a multi-segment flow-conditioning region positioned near the channel inlets. This region may incorporate tapered entry profiles, rounded inlet lips, or microscale diffuser structures configured to smooth the transition from free-stream vapor expansion to confined-channel flow. The flow-conditioning region may reduce entrance losses and suppress the formation of recirculation zones that impede vapor movement.

In certain embodiments, the microtransport channels incorporate a thermal-buffering substructure configured to maintain a stable temperature gradient along the channel length. This substructure may include thin metallic coatings, thermally conductive polymer films, or embedded heat-spreading elements that equalize temperature across the channel walls. By maintaining a slightly elevated temperature near the channel inlets and a cooler temperature near the outlets, the thermal-buffering substructure may enhance directional vapor pumping and reduce premature condensation within the channels.

In certain embodiments, the microtransport channels include a surface-energy-engineered interior lining configured to minimize droplet adhesion and promote rapid condensate removal. The interior lining may include hydrophobic nanofilms, fluorinated polymer coatings, or micro-textured surfaces that reduce contact angle hysteresis and prevent droplet pinning. This surface energy engineering may maintain unobstructed vapor flow even under high-humidity conditions.

In certain embodiments, the microtransport channels incorporate a distributed pressure equalization network that includes microperforations, bypass apertures, or lateral pressure relief corridors. These features may prevent localized over-pressurization, reduce the risk of backflow, and maintain uniform vapor velocity across the channel array. The pressure-equalization network may also improve system stability under fluctuating solar intensities.

In certain embodiments, the microtransport channels include a droplet-shedding architecture configured to prevent condensate accumulation along the channel walls. This architecture may include angled drainage grooves, microscale gutters, or directional wetting patterns that guide droplets toward designated drainage zones. The droplet-shedding architecture may be positioned at periodic intervals along the channel length to maintain a consistent vapor-flow cross-sectional area.

In certain embodiments, the microtransport channels incorporate a structural-reinforcement framework configured to maintain channel geometry under thermal cycling and mechanical loading. The reinforcement framework may include micro-ribs, lattice-like support beams, or embedded ceramic whiskers that prevent channel deformation, collapse, or warping. The reinforcement framework may be integrated into the channel walls during fabrication to ensure long-term dimensional stability.

In certain embodiments, the microtransport channels include an optical-transmission zone positioned above the photothermal layer. This zone may include transparent or semi-transparent channel walls made of glass, polycarbonate, or fluorinated polymers that allow solar irradiation to reach the photothermal surface. The optical-transmission zone may be engineered to minimize optical scattering and maintain high transmittance across the solar spectrum.

In certain embodiments, each condenser positioned at the first and second ends of the photothermal evaporator comprises a surface engineered to promote rapid droplet formation, efficient heat rejection, and continuous condensate removal. In certain embodiments, the condenser includes a surface coating selected from hydrophobic fluoropolymers, nanostructured silica coatings, or copper oxide nanoblade structures. These coatings may reduce surface energy, enhance droplet mobility, and suppress film-wise condensation, thereby increasing condensation heat-transfer coefficients. In certain embodiments, nano-textured silica and copper-oxide nanoblades may further provide hierarchical roughness that promotes Cassie-Baxter wetting states and rapid droplet shedding.

In certain embodiments, each condenser includes a plurality of condensate-routing microchannels dimensioned to direct condensed water toward a collection reservoir. The microchannels may be arranged in linear, radial, or serpentine patterns and may include hydrophilic channel walls to promote capillary-driven drainage. In certain embodiments, the microchannels prevent droplet accumulation on the condenser surface, reduce flooding, and maintain continuous condensation during high-humidity operation.

In certain embodiments, the condenser comprises an anti-fouling coating selected from graphene-based coatings, diamond-like carbon (DLC) coatings, or perfluorinated alkyl coatings. These coatings may inhibit mineral deposition, biofouling, and particulate adhesion, thereby preserving long-term condenser performance. In certain embodiments, graphene-based coatings may provide additional thermal conductivity benefits, while DLC coatings may enhance mechanical durability and scratch resistance.

In certain embodiments, each condenser includes a convective cooling surface comprising a microfin array having a fin height between about 0.5 and 10 mm and a fin spacing between about 0.2 and 2 mm. The microfin array may increase the effective heat-transfer area, enhance air mixing, and promote forced or natural convection around the condenser. In certain embodiments, the fin geometry may be optimized to maintain low thermal resistance while minimizing pressure drop in surrounding airflow.

In certain embodiments, each condenser further comprises a base plate operatively coupled to the microfin array. The base plate may be formed from a thermally conductive material such as aluminum, copper, graphite, or a thermally conductive polymer composite. In certain embodiments, the base plate is configured to maintain a temperature at least 5° C. below the vapor transport architecture during operation. This temperature differential may be generated through passive convection, radiative cooling, or integration with heat-spreading structures. Maintaining this thermal gradient may ensure continuous vapor condensation, directional vapor flow toward the condensers, and high freshwater collection efficiency.

In certain embodiments, the condensate-routing microchannels have average widths between about 20 and 300 μm, preferably 20 and 80 μm, preferably 80 and 180 μm, and preferably 180 and 300 μm.

In certain embodiments, the microfin array comprises fins having a height between about 0.5 and 10 mm, preferably 0.5 and 2 mm, preferably 2 and 6 mm, and preferably 6 and 10 mm, and a fin spacing between about 0.2 and 2 mm, preferably 0.2 and 0.6 mm, preferably 0.6 and 1.2 mm, and preferably 1.2 and 2 mm.

In certain embodiments, the base plate maintains a temperature differential of at least about 5 to 20° C. below the vapor transport architecture, preferably 5 to 10° C., and preferably 10 to 20° C.

In certain embodiments, each condenser comprises a multi-stage heat-exchange assembly engineered to convert incoming water vapor into liquid condensate with high thermal efficiency and minimal fouling. The condenser may include a thermally conductive core, a micro-structured cooling surface, and a condensate-routing subsystem arranged to maintain continuous droplet removal and stable heat rejection under varying vapor-flow conditions.

In certain embodiments, the condenser includes a thermal-gradient amplification zone positioned on the vapor-facing surface. This zone may incorporate high-conductivity metallic films, anisotropic graphite sheets, or thermally doped polymer composites configured to rapidly draw heat away from the condensing interface. The amplification zone may be engineered to maintain a temperature differential that exceeds the vapor temperature by a controlled margin, thereby accelerating nucleation and droplet formation.

In certain embodiments, the condenser incorporates a multi-texture wetting landscape configured to control droplet nucleation, growth, and departure. This landscape may include alternating hydrophobic and hydrophilic micro-domains arranged to promote rapid droplet coalescence followed by directional shedding. Hydrophilic nucleation sites may initiate droplet formation, while adjacent hydrophobic regions may reduce adhesion forces, enabling spontaneous droplet detachment under gravity or airflow.

In certain embodiments, the condenser includes a hierarchical fin array architecture in which primary fins provide bulk heat-exchange area and secondary microfins enhance local convective cooling. The hierarchical architecture may increase the effective surface area without significantly increasing flow resistance. The fin geometry may be optimized to maintain laminar airflow across the condenser surface, thereby improving heat transfer coefficients and reducing thermal boundary-layer thickness.

In certain embodiments, the condenser incorporates a vapor-entry diffuser positioned at the interface between the microtransport channels and the condenser inlet. The diffuser may include tapered expansion chambers, curved inlet vanes, or micro-scale flow straighteners configured to distribute incoming vapor uniformly across the condenser surface. This uniform distribution may prevent localized flooding, reduce droplet accumulation, and maintain consistent condensation rates.

In certain embodiments, the condenser includes a condensate-acceleration surface engineered to enhance droplet mobility. This surface may include nanostructured ridges, directional wetting gradients, or lubricant-infused porous films that reduce contact angle hysteresis and promote rapid droplet sliding. The condensate acceleration surface may be oriented to direct droplets toward the condensate routing microchannels with minimal resistance.

In certain embodiments, the condenser incorporates a thermal-buffering substructure positioned beneath the cooling surface. This substructure may include phase-change materials, heat-spreading foils, or thermally conductive lattices that modulate temperature fluctuations during intermittent vapor arrival. The thermal-buffering substructure may stabilize the condenser temperature profile and maintain consistent condensation performance under variable solar conditions.

In certain embodiments, the condenser includes a droplet-coalescence management zone configured to merge small droplets into larger droplets that detach more readily. This zone may include micro-grooved pathways, capillary-driven coalescence corridors, or patterned energy barriers that guide droplets toward coalescence sites. The coalescence management zone may reduce the number of pinned microdroplets that impede heat transfer.

In certain embodiments, the condenser incorporates a self-purging anti-fouling interface configured to remove salt crystals, particulates, or biological contaminants from the cooling surface. This interface may include periodic thermal pulses, hydrodynamic shear zones, or micro-vibration elements that dislodge accumulated debris. The self-purging interface may extend the operational lifetime of the condenser and maintain high heat-exchange efficiency.

In certain embodiments, the condenser includes a multipath condensate routing network that directs collected water toward the reservoir while preventing backflow into the vapor pathway. This network may include angled drainage channels, capillary-driven conduits, or gravity-assisted flow paths that maintain continuous condensate removal. The routing network may be positioned to avoid interference with incoming vapor streams.

Referring to FIG. 1C is an exemplary flowchart of a method for producing a 3D GO-MO nanoscroll, according to certain embodiments.

In certain embodiments, the 3D GO-MO nanoscrolls incorporated into the photothermal layer are produced through a multi-stage synthesis process that includes hydrothermal reaction, supercritical drying, fragmentation, and scrolling. In certain embodiments, the fabrication process begins by reacting graphene oxide sheets with the MO nanoparticles in an aqueous solution. The reaction may be conducted at a temperature between about 120 and 200° C. for about 6 to 24 hours, with conditions determined to promote partial reduction of graphene oxide, intercalation of metal oxide nanoparticles, and formation of a three-dimensional hydrogel network. In certain embodiments, the hydrothermal environment facilitates crosslinking between graphene oxide sheets and the nucleation of the first MO nanoparticles within the hydrogel matrix as it forms.

In certain embodiments, the first MO nanoparticles used in the hydrothermal reaction are selected from zinc oxide (ZnO), iron oxide ($Fe_3O_4$), copper oxide (CuO), titanium dioxide ($TiO_2$), aluminum oxide ($Al_2O_3$), cerium oxide ($CeO_2$), and manganese oxide ($MnO_2$). These materials may be chosen for their ability to anchor to oxygen-containing functional groups on graphene oxide, their thermal stability, and their compatibility with subsequent scrolling processes. In certain embodiments, the first MO nanoparticles serve as structural spacers that prevent restacking of graphene oxide sheets and promote the formation of a porous, mechanically robust hydrogel.

In certain embodiments, the resulting GO-MO hydrogel is subjected to supercritical drying to produce a GO-MO aerogel. Supercritical drying may be performed using carbon dioxide or another suitable supercritical fluid to remove water without collapsing the hydrogel's porous network. In certain embodiments, the supercritical drying step preserves the nanoscale architecture of the hydrogel, yielding a lightweight, high-surface-area aerogel composed of interconnected GO-MO domains.

In certain embodiments, the GO-MO aerogel is fragmented into GO-MO flakes through mechanical milling, ultrasonication, controlled shearing, or other fragmentation techniques. The resulting flakes may exhibit lateral dimensions suitable for subsequent scrolling and retain embedded first MO nanoparticles distributed throughout the graphene oxide matrix.

In certain embodiments, the GO-MO flakes are scrolled into 3D GO-MO nanoscrolls by applying a scrolling stimulus selected from sonication, chemical intercalation, thermal treatment, or pH-triggered curling. Sonication may induce localized mechanical forces that initiate curling of the flakes into helical structures. Chemical intercalation may involve the insertion of ions or molecules that generate differential strain across the flake thickness, promoting spontaneous scrolling. Thermal treatment may induce differential contraction or partial reduction of graphene oxide, driving curvature formation. pH-triggered curling may exploit protonation or deprotonation of functional groups to generate asymmetric surface stresses that roll the flakes into tubular or helical geometries.

In certain embodiments, the scrolling process yields nanoscrolls with controlled helical pitch, internal channel diameter, and wall thickness. The embedded first MO nanoparticles remain distributed within the scroll walls, providing structural reinforcement and serving as nucleation sites for subsequent deposition of the second MO nanoparticles.

In certain embodiments, the supercritical drying is performed at pressures between about 7 and 20 MPa, preferably 7 and 12 MPa, and preferably 12 and 20 MPa, and temperatures between about 30 and 80° C., preferably 30 and 50° C., and preferably 50 and 80° C.

In certain embodiments, the GO-MO flakes produced by fragmentation exhibit lateral dimensions between about 1 and 50 μm, preferably 1 and 10 μm, preferably 10 and 25 μm, and preferably 25 and 50 μm.

In certain embodiments, the scrolling stimulus produces nanoscrolls with curvature-onset strains between about 0.1 and 2%, preferably 0.1 and 0.5%, and preferably 0.5 and 2%.

Figure 3:
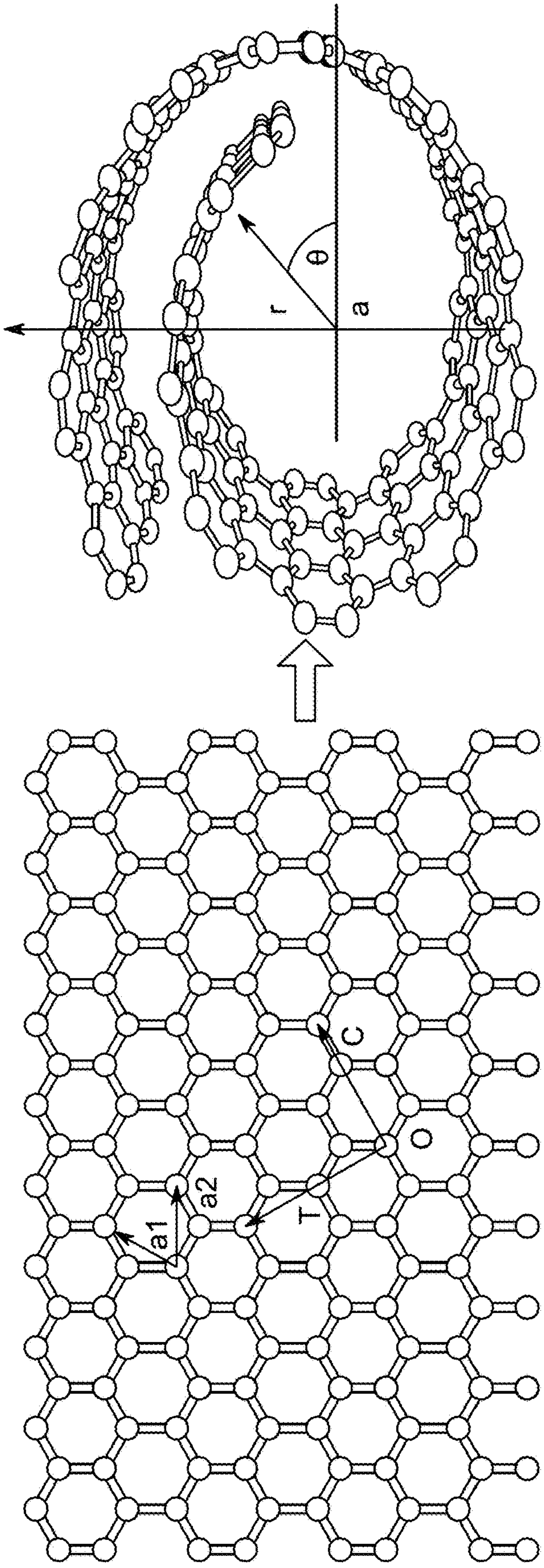
FIG. 3 is a schematic representation of the formation of a graphene nanoscroll by rolling a graphene sheet into a spiral structure defined by the chiral and translation vectors, according to certain embodiments.
Figure 4A:
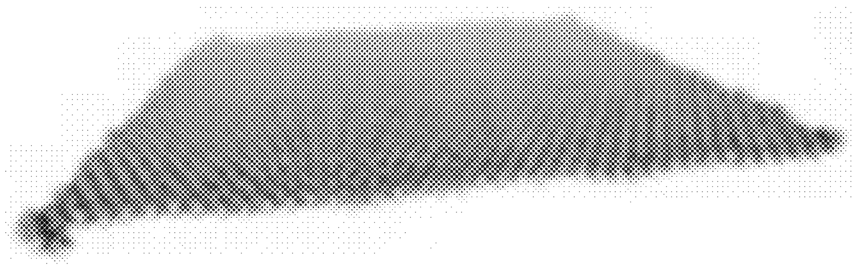
FIG. 4A is a schematic representation of an initial flat configuration C1 of a zigzag graphene nanoribbon (GNR) at t=0 picosecond (ps), according to certain embodiments.
Figure 4B:
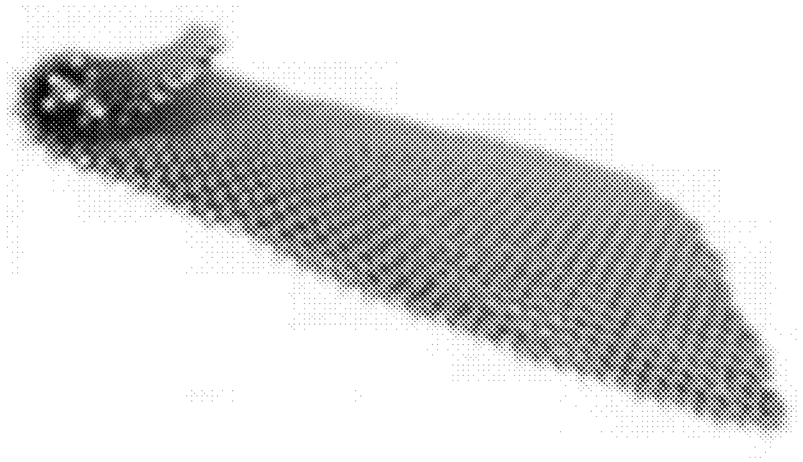
FIG. 4B is a schematic representation of an onset of edge curling C2 of the zigzag GNR at t=660 ps, according to certain embodiments.
Figure 4C:
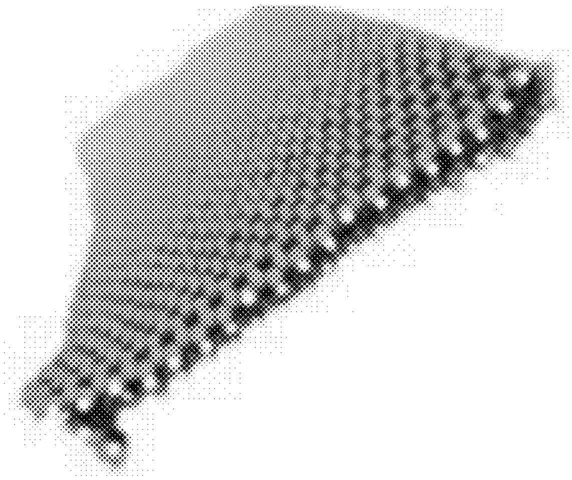
FIG. 4C is a schematic representation of further bending and partial overlap of C3 of the nanoribbon at t=1100 ps, according to certain embodiments.
Figure 4D:
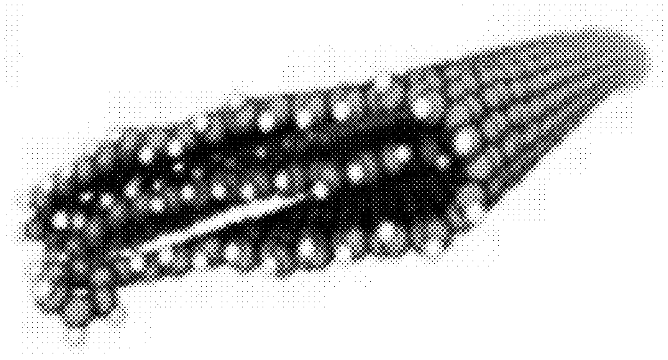
FIG. 4D is a schematic representation of the formation of an initial scroll-like structure C4 at t=2020 ps, according to certain embodiments.
Figure 4E:
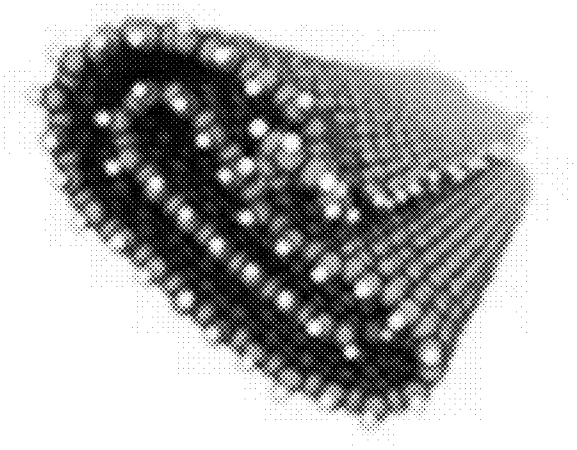
FIG. 4E is a schematic representation of continued rolling and tightening of the scroll C5 at t=2600 ps, according to certain embodiments.
Figure 4F:
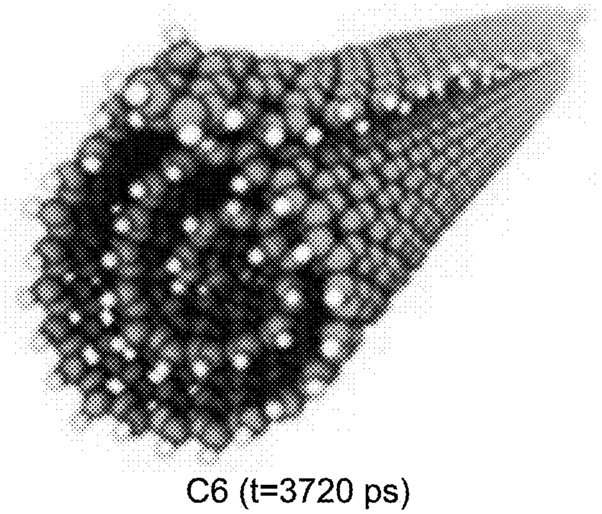
FIG. 4F is a schematic representation of increased overlap and stabilization of the nanoscroll C6 at t=3720 ps, according to certain embodiments.
Figure 4G:
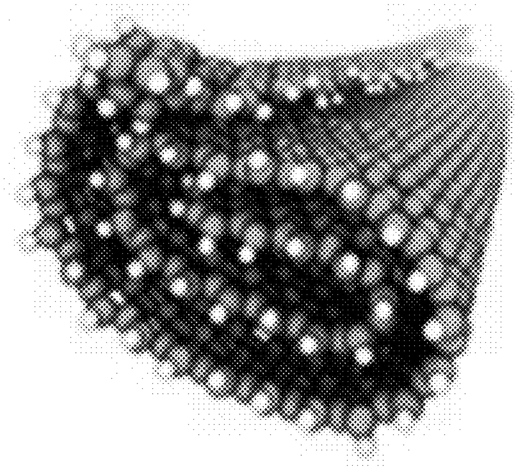
FIG. 4G is a schematic representation of a near-complete multi-layered scroll configuration C7 at t=3910 ps, according to certain embodiments.
Figure 4H:
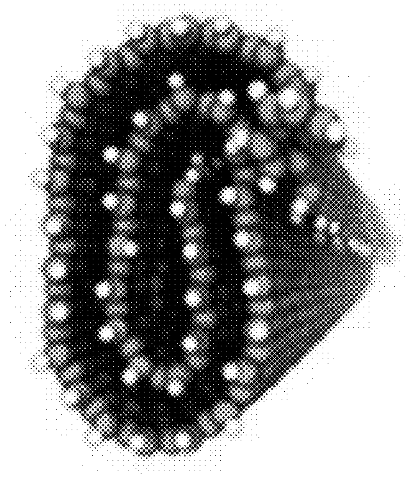
FIG. 4H is a schematic representation of a fully formed and stable nanoscroll structure C8 at t=4109 ps, according to certain embodiments.
Figure 5A:
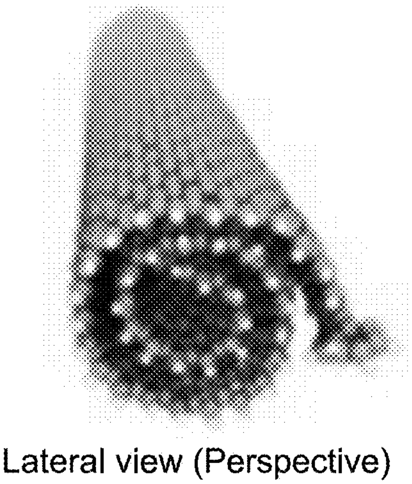
FIG. 5A is a schematic representation of a lateral perspective view of the formed nanoscroll structure, illustrating tubular morphology, according to certain embodiments.
Figure 5B:
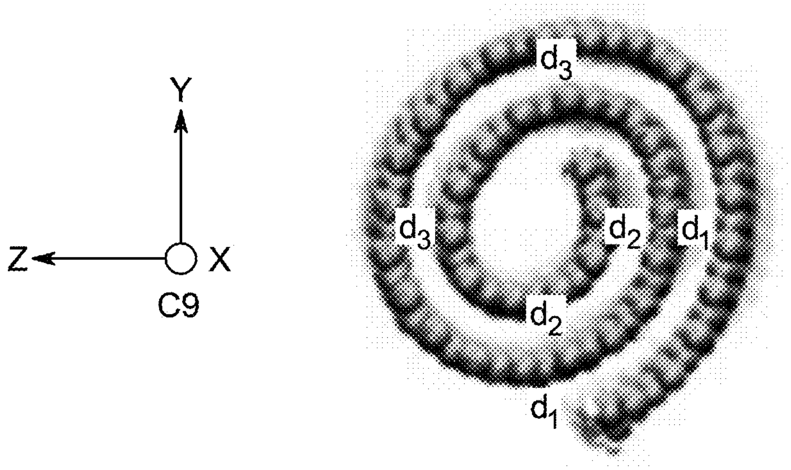
FIG. 5B is a schematic representation of a front orthographic view of the nanoscroll structure, illustrating the spiral arrangement and interlayer spacing within the scroll, according to certain embodiments.
Figure 6A:
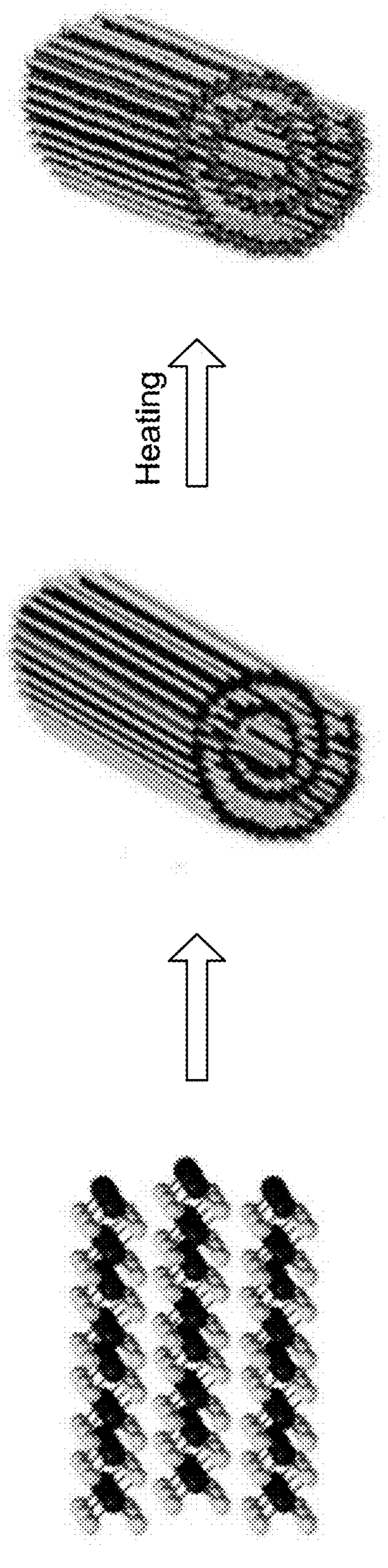
FIG. 6A is a schematic representation of the formation of pure molybdenum disulfide ($MoS_2$) nanoscrolls from layered sheets, according to certain embodiments.
Figure 6B:
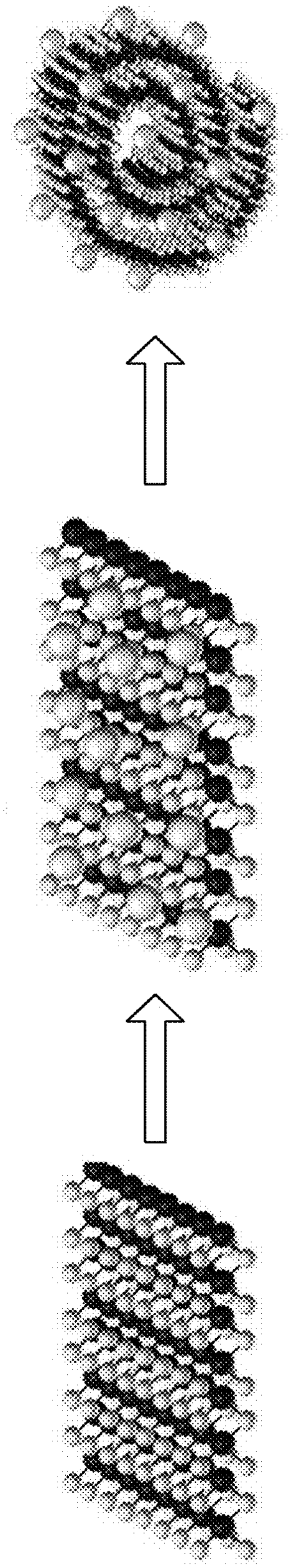
FIG. 6B is a schematic representation of the formation of $MoS_2$ nanoscrolls from layered sheets decorated with zinc-oxide (ZnO) MO nanoparticles, according to certain embodiments.
Figure 6C:
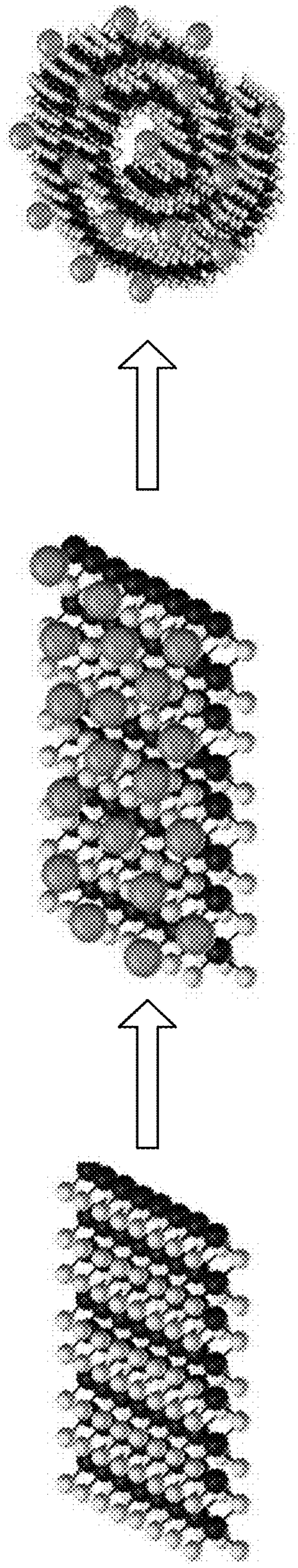
FIG. 6C is a schematic representation of the formation of $MoS_2$ nanoscrolls from layered sheets decorated with ferrous oxide (FeO) MO nanoparticles, according to certain embodiments.

According to the third aspect of the present disclosure, a method for producing a 3D GO-MO nanoscroll is described (FIG. 3). The order in which method 120 is described is not intended to be construed as a limitation, and any number of the method steps described may be combined to implement method 120. Additionally, individual steps may be removed or skipped from method 100 without departing from the spirit and scope of the present disclosure.

At step 122, method 120 includes reacting a GO sheet and first MO nanoparticles in an aqueous solution at a temperature of about 120 to 200° C. for about 6 to 24 hours to form a GO-MO hydrogel. In some embodiments, at step 122, method 120 involves reacting a GO sheet and first MO nanoparticles in an aqueous solution at a temperature between about 100 and 220° C., preferably 120 and 200° C., preferably 130 and 190° C., and preferably 140 and 180° C. for a time between about 4 and 30 hours, preferably 6 and 24 hours, preferably 8 and 20 hours, and preferably 10 and 18 hours to form a GO-MO hydrogel. In some embodiments, the reaction may be carried out under hydrothermal or solvothermal conditions to control nanoparticle distribution and hydrogel porosity.

In a preferred embodiment, reacting includes applying a heating ramp rate between about 1 and 10° $C.\cdot min^{-1}$ and forming the GO-MO hydrogel having a crosslink density between about 0.1 and 1.0 $mmol\cdot g^{-1}$. In some embodiments, reacting includes applying a heating ramp rate between about 0.5 and 15° $C.\cdot min^{-1}$, preferably 1 and 12° $C.\cdot min^{-1}$, preferably 1 and 10° $C.\cdot min^{-1}$, and preferably 2 and 8° $C.\cdot min^{-1}$ and forming the GO-MO hydrogel having a crosslink density between about 0.05 and 1.5 mmol $g^{-1}$, preferably 0.1 and 1.2 mmol $g^{-1}$, preferably 0.1 and 1.0 mmol $g^{-1}$, and preferably 0.2 and 0.8 mmol $g^{-1}$. In some embodiments, the heating ramp rate and crosslink density are determined to maximize hydrogel network formation, mechanical stability, and porosity. In a preferred embodiment, reacting is performed at a pH between about 4 and 8 and at an autogenous pressure between about 1 and 5 MPa. In some embodiments, reacting is performed at a pH between 3 and 9, preferably 4 and 8, preferably 4.5 and 7.5, and preferably 5 and 7, and under an autogenous pressure between about 0.5 and 6 MPa, preferably 1 and 5 MPa, preferably 1.5 and 4.5 MPa, and preferably 2 and 4 MPa. In some embodiments, the pH and pressure are determined to maximize nanoparticle anchoring, hydrogel formation, and structural integrity of the resulting GO-MO network.

At step 124, method 120 supercritical drying the GO-MO hydrogel to produce a 3D GO-MO aerogel. Physically, step 124 removes the solvent from the hydrogel without passing through a liquid-gas phase boundary, thereby preventing capillary forces that would normally collapse the porous network. As a result, the three-dimensional network of GO sheets and MO nanoparticles is preserved, maintaining high porosity, large surface area, and structural integrity. Step 124 allows the resulting 3D aerogel to retain a lightweight, open framework suitable for applications such as thermal management, catalysis, or adsorption.

In some embodiments, the supercritical drying is employed to convert the GO-MO hydrogel into the 3D GO-MO aerogel while preserving the hierarchical pore structure formed during hydrothermal synthesis. The hydrogel, which contains an interconnected network of GO sheets and first metal oxide nanoparticles, is initially saturated with water or a water-miscible solvent. Direct evaporation of this liquid would generate capillary forces that collapse the pore network and destroy the hydrogel's delicate architecture. To avoid this collapse, the liquid phase is replaced with a solvent such as ethanol, methanol, or acetone, which is miscible with supercritical carbon dioxide. The solvent exchange may occur gradually to prevent osmotic shock and to ensure uniform penetration of the replacement solvent throughout the hydrogel volume.

In some embodiments, the solvent-exchanged hydrogel is placed inside a high-pressure vessel and exposed to liquid carbon dioxide under controlled temperature and pressure conditions. Carbon dioxide diffuses into the hydrogel, replacing the organic solvent through repeated flushing cycles. As the concentration of the original solvent decreases, the hydrogel becomes fully saturated with liquid $CO_2$. The system is then heated and pressurized beyond the critical point of carbon dioxide, above 31° C. and 7.4 MPa, at which point the distinction between liquid and gas phases disappears. In the supercritical state, carbon dioxide exhibits gas-like diffusivity and liquid-like density, enabling it to penetrate the hydrogel uniformly without generating capillary forces.

In some embodiments, the transition to the supercritical state eliminates the liquid-vapor interface within the hydrogel, preventing the formation of menisci that would otherwise exert capillary pressure on the pore walls. The absence of capillary forces allows the hydrogel to retain its original pore geometry, including micropores, mesopores, and macropores formed during hydrothermal crosslinking. The GO sheets remain separated by the first metal oxide nanoparticles, and the hierarchical network of struts, nodes, and channels remains intact. The supercritical fluid uniformly supports the pore walls, preventing collapse even in regions of high curvature or thin lamellae.

In some embodiments, the supercritical carbon dioxide is gradually vented from the vessel while maintaining conditions above the critical point to avoid reintroducing a liquid-vapor interface. The pressure is slowly reduced to allow the supercritical $CO_2$ to escape without inducing mechanical stress in the aerogel framework. As the pressure drops below the critical point, the $CO_2$ transitions directly into a gas phase without forming liquid droplets, thereby avoiding capillary condensation. The gas then diffuses out of the aerogel, leaving behind a dry, lightweight, and structurally intact 3D GO-MO aerogel.

In some embodiments, the supercritical drying produces an aerogel with a bulk density between about 5 and 50 $mg/cm^3$ and a porosity between about 50% and 95%. The pore network may exhibit a fractal morphology with interconnected channels spanning multiple length scales, from nanometer-sized voids between GO sheets to micron-sized cavities formed by collapsed or fused regions. The preservation of this hierarchical pore structure is significant for subsequent fragmentation into micro-flakes and for the scrolling behavior that produces the nanoscroll. The aerogel's mechanical resilience, optical scattering properties, and fluid-transport characteristics are direct consequences of the pore architecture preserved during supercritical drying.

In some embodiments, the supercritical drying influences the alignment and orientation of micro-channels within the aerogel. As the hydrogel transitions into the aerogel state, slight anisotropic stresses may arise from differential shrinkage or from the distribution of metal oxide nanoparticles. These stresses may induce partial alignment of pore channels along preferred directions, producing elongated or anisotropic pores that facilitate vapor transport during irradiation. The degree of alignment may be characterized by an average orientation deviation less than about 30°, indicating a semi-ordered pore network that enhances directional fluid flow.

In some embodiments, supercritical drying contributes to the aerogel's thermal and optical properties. The low density and high porosity reduce thermal conductivity, thereby confining heat near the evaporation interface during irradiation. The preserved pore network increases light scattering and extends the optical path length within the aerogel, enhancing solar absorption and photothermal conversion.

In a preferred embodiment, supercritical drying is performed using supercritical $CO_2$ at a temperature between about 31 and 80° C. and a pressure between about 7.5 and 20 MPa. In some embodiments, supercritical drying is performed using supercritical $CO_2$ at a temperature between about 25 and 100° C., preferably 31 and 90° C., preferably 31 and 80° C., and preferably 35 and 75° C., and a pressure between about 5 and 25 MPa, preferably 7.5 and 22 MPa, preferably 7.5 and 20 MPa, and preferably 8 and 18 MPa. In some embodiments, the temperature and pressure are determined to preserve the 3D GO-MO network, maintain porosity, and prevent structural collapse during drying.

In a preferred embodiment, the supercritical drying induces partial alignment of microchannels, with an average orientation deviation of less than 30°, within the 3D GO-MO aerogel. In some embodiments, the supercritical drying induces partial alignment of microchannels having an average orientation deviation between about 5° and 45°, preferably 10° and 40°, preferably 15° and 35°, and preferably less than 30° within the 3D GO-MO aerogel. In some embodiments, the drying may produce microchannels with a broader orientation distribution for more isotropic pore networks. In some embodiments, the degree of alignment is controlled to maximize mass transport, fluid flow, and thermal or photothermal performance of the aerogel.

In a preferred embodiment, the supercritical drying produces a 3D GO-MO aerogel exhibiting diffuse reflectance between about 5% and 20% over a wavelength range between about 300 and 2500 nm. In some embodiments, the supercritical drying produces the 3D GO-MO aerogel exhibiting a diffuse reflectance between about 3% and 25%, preferably 5% and 20%, preferably 6% and 18%, and preferably 7% and 15% across a wavelength range between about 300 and 2500 nm. In some embodiments, the aerogel exhibits higher diffuse reflectance, thereby enhancing light scattering. In some embodiments, the reflectance is tuned to maximize light absorption, photothermal conversion, or optical performance.

In a preferred embodiment, the supercritical drying produces a 3D GO-MO aerogel exhibiting a bulk density between about 5 and 30 mg cm 3, as measured by gravimetric mass-to-volume analysis. In some embodiments, the supercritical drying produces the 3D GO-MO aerogel exhibiting a bulk density between about 3 and 35 mg cm 3, preferably 5 and 30 mg $cm^{-3}$ preferably 8 and 25 mg $cm^{-3}$, and preferably 10 and 20 mg $cm^{-3}$, as measured by gravimetric mass-to-volume analysis. In some embodiments, the bulk density may be adjusted to balance mechanical strength, porosity, and surface area. In some embodiments, a lower bulk density is determined to enhance light-absorption and thermal-insulation properties.

In a preferred embodiment, the supercritical drying produces a 3D GO-MO aerogel exhibiting a thermal conductivity between about 0.02 and 0.08 $W \cdot m^{-1} \cdot K^{-1}$, as measured by the transient hot-wire method. In some embodiments, the supercritical drying produces the 3D GO-MO aerogel exhibiting a thermal conductivity between about 0.01 and 0.1 $W \cdot m^{-1} \cdot K^{-1}$, preferably 0.02 and 0.08 $W \cdot m^{-1} \cdot K^{-1}$, preferably 0.025 and 0.07 $W \cdot m^{-1} \cdot K^{-1}$, and preferably 0.03 and 0.06 $W \cdot m^{-1} \cdot K^{-1}$, as measured by a transient hot wire method. In some embodiments, the thermal conductivity may be tuned by controlling porosity, microchannel alignment, and GO-MO network density to maximize thermal insulation or photothermal performance.

In a preferred embodiment, the supercritical drying produces the 3D GO-MO aerogel exhibiting a BET surface area between about 200 and 800 $m^2 g^{-1}$, as measured by nitrogen adsorption-desorption isotherms. In some embodiments, the supercritical drying produces the 3D GO-MO aerogel exhibiting a BET surface area between about 150 and 900 $^2 \cdot g^{-1}$, preferably 200 and 800 $^2 \cdot g^{-1}$, preferably 250 and 700 $^2 \cdot g^{-1}$, and preferably 300 and 600 $^2 \cdot g^{-1}$, as measured by nitrogen adsorption-desorption isotherms. In some embodiments, the surface area may be tuned by controlling pore size, microchannel alignment, and GO-MO network density to maximize adsorption, catalytic activity, or photothermal efficiency.

In a preferred embodiment, the supercritical drying produces a 3D GO-MO aerogel exhibiting a fractal aerogel morphology with a fractal dimension between about 2.2 and 2.8, as determined by box-counting analysis of a SEM micrograph. In some embodiments, the supercritical drying produces a 3D GO-MO aerogel exhibiting a fractal aerogel morphology with a fractal dimension between about 2.0 and 3.0, preferably 2.2 and 2.8, preferably 2.3 and 2.7, and preferably 2.4 and 2.6, as determined by box-counting analysis of a SEM micrograph. In some embodiments, the fractal dimension may be adjusted to control pore connectivity, surface roughness, and structural complexity for maximized mass transport, light absorption, or catalytic performance.

At step 126, method 120 includes fragmenting the 3D GO-MO aerogel into GO-MO flakes and scrolling the GO-MO flakes into a 3D GO-MO nanoscroll by applying a scrolling stimulus determined from the group consisting of sonication, chemical intercalation, thermal treatment, and pH-triggered curling. Physically, the step 126 transforms the planar or fragmented GO-MO sheets into a rolled, tubular, or helical morphology. The scrolling stimulus induces mechanical, chemical, or thermal stresses that overcome the sheet's bending rigidity, causing the flakes to curl and form stable nanoscrolls. The step 126 enhances surface area, creates confined nanoscale cavities, and introduces structural anisotropy, which may improve thermal transport, light absorption, and catalytic activity of the resulting 3D GO-MO nanoscroll.

In some embodiments, the fragmenting converts the 3D GO-MO aerogel into discrete micro-flakes that retain the hierarchical pore structure, nanoparticle distribution, and mechanical anisotropy of the parent aerogel. The aerogel, produced through hydrothermal crosslinking and supercritical drying, possesses a lightweight, brittle, and highly porous architecture that is particularly susceptible to controlled fracture. The fragmenting may occur through mechanical agitation, sonication, shear deformation, or compressive loading, each inducing localized stresses that exceed the aerogel's fracture strength and cause it to break along natural planes of weakness. These planes may arise from variations in GO sheet orientation, nanoparticle density, pore alignment, or residual stresses introduced during the supercritical drying.

In some embodiments, the fragmenting is performed by applying gentle mechanical pressure to the aerogel, causing it to fracture into irregularly shaped flakes with lateral dimensions between about 5 and 200 μm. The brittle nature of the aerogel ensures that the fracture propagates cleanly through the pore network without collapsing the internal channels or damaging the GO-MO framework. The resulting micro-flakes preserve the lamellar, crumpled, or folded morphology of the GO sheets, as well as the spatial distribution of the first metal oxide nanoparticles embedded within the structure. This preservation is significant for maintaining the mechanical flexibility and scrolling behavior required for subsequent nanoscroll formation.

In some embodiments, the fragmenting is attained through sonication, which introduces transient cavitation events that generate localized shockwaves and microjets. These forces propagate through the aerogel and create high-strain regions that initiate fracture. The porous architecture of the aerogel allows the shockwaves to travel along tortuous pathways, producing micro-flakes with diverse geometries and thicknesses. Sonication may also remove loosely bound debris or collapsed pore fragments, yielding cleaner, more uniform flakes that scroll more predictably when exposed to scrolling stimuli.

In some embodiments, the fragmenting occurs through shear deformation, in which the aerogel is subjected to lateral forces that cause layers of GO sheets to slide relative to one another. The shear forces may concentrate at regions where the GO sheets are weakly crosslinked or where the pore walls are thin, producing controlled delamination and flake formation. This mechanism may generate micro-flakes with smoother edges and more uniform thickness than those produced by compressive fracture. The resulting flakes may exhibit enhanced scrolling behavior due to their reduced structural irregularities.

In some embodiments, the fragmenting is influenced by the distribution of first metal oxide nanoparticles within the aerogel. Regions with higher nanoparticle density may exhibit increased stiffness and fracture resistance, causing the aerogel to break preferentially in nanoparticle-poor regions. This fracture may produce micro-flakes with spatially varying nanoparticle concentrations, which in turn influence the scrolling direction, curvature radius, and photothermal response of the resulting nanoscrolls. The interplay between nanoparticle distribution and fracture mechanics, therefore, contributes to the diversity of nanoscroll geometries observed after scrolling.

In some embodiments, the fragmenting preserves the aerogel's internal pore architecture, including micropores, mesopores, and macropores formed during hydrothermal crosslinking and supercritical drying. The preserved pore network ensures that the micro-flakes remain lightweight, flexible, and capable of undergoing scrolling when exposed to stimuli such as sonication, pH adjustment, or solvent exchange. The pore architecture also facilitates rapid solvent infiltration during scrolling, enabling the flakes to bend and roll without structural collapse. The integrity of the pore network is therefore significant for maintaining the functional properties of the nanoscrolls, including their ability to support micro-chimney vapor transport, photothermal-driven convection, and Marangoni flow during irradiation.

In some embodiments, the fragmenting contributes to the optical and thermal properties of the final nanoscroll. The micro-flakes produced through controlled fracture exhibit rough, irregular surfaces that enhance light scattering and increase optical path length during irradiation. This scattering effect improves solar absorption and photothermal conversion efficiency. The preserved nanoparticle distribution ensures that the flakes retain their photothermal activity, enabling them to generate localized heating and fluid-dynamic instabilities once scrolled.

In a preferred embodiment, fragmenting is performed with an energy input between about 10 and 200 J. In some embodiments, fragmenting is performed at an energy input between about 5 and 250 J, preferably 10 and 200 J, preferably 20 and 180 J, and preferably 30 and 150 J. In some embodiments, the energy input is adjusted to control flake size, thickness, and uniformity, thereby optimizing subsequent scrolling and nanoscroll formation.

In a preferred embodiment, fragmenting increases the edge defect density of the GO-MO flakes to a Raman ID/IG ratio between about 0.9 and 1.5. In some embodiments, fragmenting increases an edge defect density of the GO-MO flakes to a Raman I_D/I_G ratio between about 0.8 and 1.6, preferably 0.9 and 1.5, preferably 1.0 and 1.4, and preferably 1.1 and 1.3. In some embodiments, the defect density may be tuned to enhance reactivity, nanoparticle anchoring, and photothermal or catalytic performance of the resulting nanoscrolls.

In a preferred embodiment, fragmenting produces GO-MO flakes with lateral dimensions between about 1 and 50 μm. In some embodiments, fragmenting produces GO-MO flakes having lateral dimensions between about 0.5 and 20 μm. In other embodiments, the flakes range from about 5 to 100 μm. In some embodiments, flakes are less than about 10 μm to enhance dispersion, while in further embodiments, flakes greater than about 50 μm are obtained to maintain structural integrity.

In a preferred embodiment, the fragmenting has an intrinsic curvature radius between about 0.5 μm and 5 μm prior to the scrolling. In some embodiments, fragmenting produces GO-MO flakes having an intrinsic curvature radius between about 0.3 μm and 6 μm, preferably 0.5 μm and 5 μm, preferably 0.7 μm and 4 μm, and preferably 1 μm and 3 μm prior to scrolling. In some embodiments, the intrinsic curvature is controlled to facilitate uniform scrolling, maximize scroll diameter, and enhance structural stability of the 3D GO-MO nanoscrolls.

In some embodiments, fragmenting produces GO-MO flakes having a thickness between about 3 and 60 nm, preferably 5 and 50 nm, preferably 8 and 40 nm, and preferably 10 and 30 nm. In some embodiments, the thickness is controlled to maximize flexibility, scrolling efficiency, and surface area of the resulting 3D GO-MO nanoscrolls.

In some embodiments, GO-MO flakes may be scrolled into 3D GO-MO nanoscrolls using alternative stimuli such as mechanical shear or stirring, magnetic or electric fields, solvent-induced scrolling, light or photothermal treatment, and chemical functionalization gradients. Such approaches enable control over scroll morphology, diameter, and helicity for tailored functional performance.

In some embodiments, the scrolling is initiated by differential stresses across the thickness of the GO-MO flake. The GO sheet contains oxidized regions rich in hydroxyl, epoxy, and carboxyl groups, as well as partially reduced $sp^2$ domains formed during hydrothermal treatment. These chemically distinct regions exhibit different swelling behaviors when exposed to solvents, pH changes, or thermal gradients. When one side of the flake swells or contracts more than the other, a bending moment is generated that causes the flake to curl. The presence of the first metal oxide nanoparticles embedded within the GO sheet may further amplify this effect by introducing localized stiffness variations or by altering the hydration behavior of the surrounding carbon lattice.

In some embodiments, the scrolling occurs through mechanical activation, such as sonication, which introduces transient cavitation events that impart localized impulses to the flake. These impulses may create initial curvature by deforming regions of the flake where the pore walls are thin or where the nanoparticle density is low. Once curvature is established, van der Waals interactions between overlapping regions of the GO sheet promote continued rolling, stabilizing the scroll as it forms. The porous architecture of the flake allows solvent to infiltrate during scrolling, reducing mechanical resistance and enabling smooth, continuous rolling without structural collapse.

In some embodiments, the scrolling is driven by solvent exchange, in which the flake is transferred from a high-polarity solvent to a lower-polarity solvent. The oxidized regions of the GO sheet may swell preferentially in the high-polarity solvent, while the reduced regions may interact more strongly with the lower-polarity solvent. This asymmetric swelling generates internal stresses that cause the flake to bend and roll. As the solvent evaporates or diffuses away, the nanoscroll tightens and stabilizes into its final morphology. The presence of metal oxide nanoparticles may influence the solvent-surface interactions, guiding the scrolling direction and determining the radius of curvature.

In some embodiments, the scrolling is induced by pH adjustment, which alters the ionization state of the oxygen-containing functional groups on the GO sheet. At low pH, protonation reduces electrostatic repulsion between adjacent regions of the sheet, allowing them to approach more closely and facilitating curvature. At high pH, deprotonation increases electrostatic repulsion on one side of the sheet relative to the other, creating a differential surface charge that drives asymmetric swelling. These pH-dependent effects may initiate curling and guide the formation of a stable nanoscroll. The embedded metal oxide nanoparticles may further modulate the local pKa environment, producing spatially varying charge densities that influence the scrolling pathway.

In some embodiments, the scrolling produces nanoscrolls with diameters between about 50 and 500 nm, wall thicknesses corresponding to the number of GO layers present, and internal channels that remain open during operation. The geometry of the nanoscroll, including its helical pitch, curvature radius, and channel tortuosity, may depend on the magnitude, duration, and type of scrolling stimulus applied. The resulting nanoscrolls exhibit mechanical resilience, structural stability, and fluid transport properties that are significant for supporting microchimney vapor pathways, photothermal-driven convection, Marangoni flow, and buoyancy oscillations during irradiation.

In some embodiments, the scrolling ensures that the internal channels of the nanoscroll remain accessible to water molecules and vapor during photothermal desalination. The open, helical channels facilitate rapid vapor escape, promote directional fluid flow, and enhance the formation of thermal gradients that drive photothermal-induced instabilities. The structural integrity of the nanoscroll allows it to withstand repeated thermal cycling, solvent exchange, and mechanical agitation without collapsing or delaminating.

In a preferred embodiment, scrolling is performed at a frequency between about 20 and 60 kHz. In some embodiments, scrolling is performed at a frequency between about 15 and 70 kHz, preferably 20 and 60 kHz, preferably 25 and 55 kHz, and preferably 30 and 50 kHz. In some embodiments, the scrolling frequency is determined to control curl rate, scroll uniformity, and the final morphology of the 3D GO-MO nanoscrolls.

In a preferred embodiment, scrolling is performed at a temperature gradient between about 10° C. and 80° C. In some embodiments, scrolling is performed using a temperature gradient between about 5° C. and 90° C., preferably 10° C. and 80° C., preferably 15° C. and 70° C., and preferably 20° C. and 60° C. In some embodiments, the temperature gradient is determined to control the scrolling rate, scroll tightness, and structural uniformity of the 3D GO-MO nanoscrolls.

In a preferred embodiment, scrolling is performed at a pH between about 2 and 5. In some embodiments, scrolling is performed at a pH between about 1 and 6, preferably 2 and 5, preferably 2.5 and 4.5, and preferably 3 and 4. In some embodiments, the pH is determined to control flake curling, scroll uniformity, and stability of the 3D GO-MO nanoscrolls. In some embodiments, scrolling is induced by exchanging water with a solvent determined from the group consisting of ethanol, isopropanol, acetone, and acetonitrile. In some embodiments, the solvent exchange creates differential swelling or surface tension across the GO-MO flakes, causing them to curl into 3D nanoscrolls. In some embodiments, the choice of solvent is tuned to control scroll diameter, helicity, and structural uniformity.

In a preferred embodiment, scrolling uses ions selected from the group consisting of Lit, $Na^+$, $K^+$, and $Mg^{2+}$ at concentrations between about 0.01 and 0.5 M. In some embodiments, scrolling uses ions selected from the group consisting of Lit, $Na^+$, $K^+$, and $Mg^{2+}$ at concentrations between about 0.005 and 1 M, preferably 0.01 and 0.5 M, preferably 0.02 and 0.4 M, and preferably 0.05 and 0.3 M. In some embodiments, the ions interact electrostatically with the GO-MO flakes to induce curling and formation of 3D nanoscrolls. In some embodiments, the ion type and concentration are tuned to control scroll tightness, diameter, and uniformity.

In a preferred embodiment, scrolling produces a 3D GO-MO nanoscroll with an axial straightness deviation of less than 10°, bundles of about 2 to 20 nanoscrolls, and a polarization-dependent absorption ratio between about 1.2 and 2.5. In some embodiments, scrolling produces the 3D GO-MO nanoscroll having an axial straightness deviation less than 10°, preferably less than 8°, preferably less than 5°, and preferably less than 3°; bundles of about 2 to 20 nanoscrolls, preferably 3 to 18, preferably 4 to 15, and preferably 5 to 12 nanoscrolls; and a polarization-dependent absorption ratio between about 1.2 and 2.5, preferably 1.3 and 2.3, preferably 1.4 and 2.1, and preferably 1.5 and 2.0. In some embodiments, such parameters are controlled to maximize light absorption, photothermal conversion efficiency, and directional transport properties of the nanoscrolls.

At step 128, method 120 includes disposing second MO nanoparticles onto inner and outer surfaces of the 3D GO-MO nanoscroll to form the MO-decorated 3D GO-MO nanoscroll. Physically, step 128 functionalizes the nanoscroll by uniformly attaching nanoparticles to both the internal cavities and the external surfaces, thereby enhancing surface area, active sites, and interactions with light or reactants. The decoration may be attained through chemical bonding, electrostatic attraction, or physical adsorption, enabling the nanoscroll to exhibit combined semiconductor- and plasmon-mediated photothermal properties, improved catalytic activity, and enhanced thermal or optical performance.

In some embodiments, disposing the second MO nanoparticles onto the 3D GO-MO nanoscroll involves anchoring, depositing, nucleating, or otherwise immobilizing a secondary population of metal oxide nanoparticles onto both the inner and outer surfaces of the scroll. The deposition may be carried out through wet-chemical deposition, vapor-phase infiltration, ligand-assisted adsorption, or in situ precursor hydrolysis, each producing a conformal or semi-conformal distribution of nanoparticles along the scroll's helical architecture.

In some embodiments, disposing includes immersing the nanoscrolls in a precursor solution containing dissolved metal salts, metal-oxo clusters, or metal-ligand complexes corresponding to the desired second MO composition. The precursor species may diffuse into the internal channels of the nanoscroll, adsorb onto oxygen-containing functional groups, and nucleate into nanoparticles upon pH adjustment, thermal activation, or chemical reduction. The porous, hydrophilic nature of the GO-MO framework facilitates deep infiltration of the precursor solution, ensuring that nanoparticles form not only on the outer scroll surface but also along the internal helical walls.

In some embodiments, the disposing includes ligand-mediated anchoring, in which the GO-MO nanoscroll is exposed to a solution containing preformed second MO nanoparticles functionalized with surface ligands such as citrate, polyacrylate, amine-terminated polymers, or thiol-containing molecules. These ligands may coordinate with oxygen-containing groups on the GO sheet or with hydroxylated sites on the first MO nanoparticles embedded within the scroll wall. The ligand interactions promote adsorption and immobilization of the second MO nanoparticles, producing a controlled surface density and spatial distribution. The anchoring density may range between about $10^9$ and $10^{12}$ particles $cm^{-2}$, depending on ligand chemistry, nanoparticle size, and scroll porosity.

In some embodiments, the disposing includes vapor-phase deposition techniques such as chemical vapor deposition (CVD), atomic layer deposition (ALD), or aerosol-assisted infiltration. These methods enable the formation of ultrathin, conformal coatings of second MO nanoparticles along the scroll surfaces. The vapor-phase precursors may penetrate the internal channels and deposit uniformly along the helical walls, producing a continuous or discontinuous nanoparticle layer. The deposition temperature, precursor pulse duration, and carrier gas composition may be tuned to control nanoparticle size, crystallinity, and surface coverage.

In some embodiments, the disposing includes controlled hydrolysis or precipitation of metal precursors within the scroll interior. The GO-MO nanoscroll may be immersed in a precursor solution and then exposed to a pH-adjusting agent, such as ammonia, urea, or sodium hydroxide. The localized hydrolysis of the precursor species produces nanoparticles that nucleate directly on the scroll surfaces. The confined geometry of the internal channels restricts nanoparticle growth, yielding small, uniformly distributed particles that maximize the density of photothermal hotspots.

In some embodiments, the disposing includes spatial deposition, in which the inner and outer scroll surfaces receive different nanoparticle densities or compositions. This may be attained by sequential immersion in precursor solutions, directional vapor infiltration, or ligand-patterned adsorption. The spatial deposition enables the engineering of asymmetric photothermal responses, radial thermal gradients, or directional vapor-pumping behavior within the nanoscroll.

In some embodiments, the disposing establishes the photothermal functionality of the nanoscroll by creating a distributed network of semiconductor or plasmonic nanoparticles that act as nanoscale heat sources during irradiation. The anchored second MO nanoparticles generate localized temperature elevations between about 5 and 25° C. relative to the surrounding liquid, initiating vapor nucleation at multiple points along the nanoscroll. The density, size, and spatial disposition of the nanoparticles determine the magnitude of the thermal gradients, the intensity of micro-convection and Marangoni flows, and the efficiency of vapor transport through the internal channels.

In a preferred embodiment, disposing includes nucleating the second MO nanoparticles in a MO precursor solution at a concentration between about 1 and 100 mM, and a temperature between about 60° C. and 90° C. for a duration of 2 to 24 hours in situ via wet chemical precipitation. In some embodiments, disposing includes nucleating the second MO nanoparticles in a MO precursor solution at a concentration between about 0.5 and 150 mM, preferably 1 and 100 mM, preferably 5 and 80 mM, and preferably 10 and 50 mM; at a temperature between about 50° C. and 100° C., preferably 60° C. and 90° C., preferably 65° C. and 85° C., and preferably 70° C. and 80° C.; for a duration of 1 to 30 hours, preferably 2 to 24 hours, preferably 4 to 20 hours, and preferably 6 to 18 hours. In some embodiments, the nanoparticles are formed in situ on the GO-MO nanoscroll via wet chemical precipitation to yield uniform surface coverage and maximized anchoring.

In a preferred embodiment, the MO-decorated 3D GO-MO nanoscroll has an average pore diameter between about 10 and 500 nm, a scroll diameter between about 50 and 500 nm, and a lateral dimension between about 5 and 200 μm. In some embodiments, the MO-decorated 3D GO-MO nanoscroll has an average pore diameter between about 10 and 500 nm, preferably 20 and 400 nm, preferably 30 and 300 nm, and preferably 50 and 250 nm; a scroll diameter between about 50 and 500 nm, preferably 80 and 400 nm, preferably 100 and 350 nm, and preferably 120 and 300 nm; and a lateral dimension between about 5 and 200 μm, preferably 10 and 180 μm, preferably 20 and 150 μm, and preferably 30 and 120 μm, with values determined to maximize surface area, porosity, and structural stability.

EXAMPLES

The following examples demonstrate a method for desalinating saltwater as described herein. The examples are provided for illustration and are not to be construed as limitations of the present disclosure, as many variations thereof are possible without departing from the spirit and scope of the present disclosure.

Example 1: Nanoparticle Synthesis

The composite nanoparticles are synthesized through a hydrothermal process where pre-prepared graphene sheet (GO) is combined with zinc oxide (ZnO) or ferrous oxide (FeO) nanoparticles in controlled weight ratios (e.g., 75:25, 50:50, 25:75). The suspension is treated at approximately 180° C. for 18 hours to promote uniform nanorod deposition of metal oxides onto GO sheets. The final product is centrifuged, washed, and dried to yield stable GO-ZnO or GO-FeO nanocomposites with a size of <100 nm. FIG. 1C illustrates a method for producing a 3D GO-MO nanoscroll, and FIG. 3 shows the formation of a graphene nanoscroll by rolling a graphene sheet into a spiral structure defined by chiral and translation vectors.

Example 2: Nanofluid Preparation

A two-step method is employed, where the synthesized nanocomposites are dispersed in deionized water at concentrations ranging from 0.02 percent weight (wt. %) to 0.03 wt. % using magnetic stirring and ultrasonic agitation to prevent agglomeration. The fragmented GO-MO aerogel may also be treated via a scrolling stimulus prior to dispersion, as shown in FIG. 1B.

Example 3: Photothermal Testing System

Figure 2:
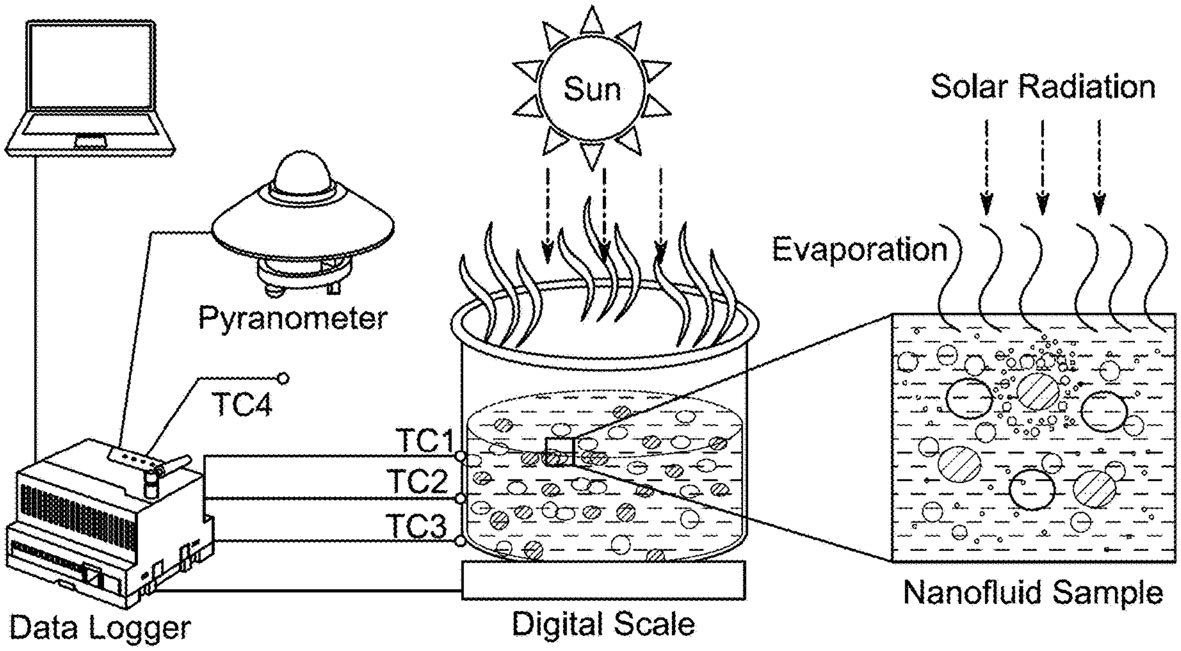
FIG. 2 is a schematic illustration of an experimental setup to test the photothermal and vaporization performance of various composite nanofluids, according to certain embodiments.

The prepared nanofluids are placed in a solar absorption cell (e.g., a quartz or glass petri dish within a direct absorption solar collector (DASC)). Natural sunlight is used as the radiation source. A pyranometer measures solar irradiance, K-type thermocouples record temperatures at different depths in the fluid, and a digital balance monitors mass loss due to evaporation. FIG. 2 provides a schematic illustration of the experimental setup.

The following performance metrics are evaluated: optical absorption spectrum (UV-vis, 200 nm-1000 nm), sensible heat efficiency, evaporative efficiency, photothermal conversion efficiency ($\eta_{pte}$), and specific absorption rate (SAR).

FIG. 1D illustrates a schematic representation of an advanced solar-driven desalination system in accordance with one embodiment of the present disclosure. The system includes a vapor-transport architecture disposed between a first end and a second end, configured to receive solar radiation and convert it into thermal energy for desalination. A photothermal layer positioned beneath the vapor-transport architecture absorbs incident solar radiation and generates heat, thereby inducing rapid water evaporation. Circular nanoscroll structures within the photothermal layer enhance light absorption and localized heat generation, promoting efficient vapor formation and upward vapor escape.

A thermal insulation layer is disposed below the photothermal layer to minimize downward heat loss and confine thermal energy within the evaporation zone. Beneath the thermal-insulation layer, a microfluidic wicking lattice is provided to continuously transport feed water to the photothermal layer via capillary action. Vapor generated at the photothermal layer migrates upward through the vapor transport architecture, while condensed freshwater is collected at the system's ends and discharged as freshwater outflow. The illustrated configuration enables efficient solar thermal conversion, controlled heat management, and enhanced freshwater production, suitable for compact and scalable desalination applications. The photothermal performance of the different composites (GO-FeO and GO-ZnO) nanofluids at various concentration mixing ratios was investigated under natural sunlight.

The disclosure discloses a nanofluid-based direct solar absorption system including graphene oxide-metal oxide composite nanoparticles suspended in a base fluid (preferably deionized water). The nanofluid acts simultaneously as the absorption medium and heat carrier within a DASC, as shown in FIG. 2.

Increasing nanoparticle concentration from 0.02 wt. % to 0.03 wt. % enhanced the evaporation rate and overall photothermal efficiency. Pure GO nanofluids yielded the highest bulk temperature rise and evaporation mass loss, confirming superior solar absorption. GO-ZnO and GO-FeO composites exhibited improved performance compared to single-component ZnO or FeO fluids, thereby validating the synergistic interaction between carbon and metal oxides. The system yielded a maximum photothermal conversion efficiency of 92% and operated stably without sedimentation or degradation.

In some embodiments, the nanofluid directly absorbs incident solar radiation, minimizing conduction and convection losses common in flat-plate collectors, while integrating GO with ZnO or FeO provides synergistic optical enhancement by broadening the solar absorption spectrum and improving energy conversion efficiency. The nanocomposite morphology ensures exceptional stability by preventing particle agglomeration and maintaining optical clarity and thermal uniformity. The $sp^2$ carbon structure of GO imparts high thermal conductivity, enabling superior heat transport and uniform temperature distribution. The hydrothermal-ultrasonic fabrication method enables consistent nanoscale synthesis using economical materials, yielding a system that is adaptable and functions efficiently under varying sunlight and ambient conditions. The combination yields record photothermal efficiency, exceeding known nanofluid combinations under equivalent conditions and demonstrating clear technical innovation.

Figure 7:
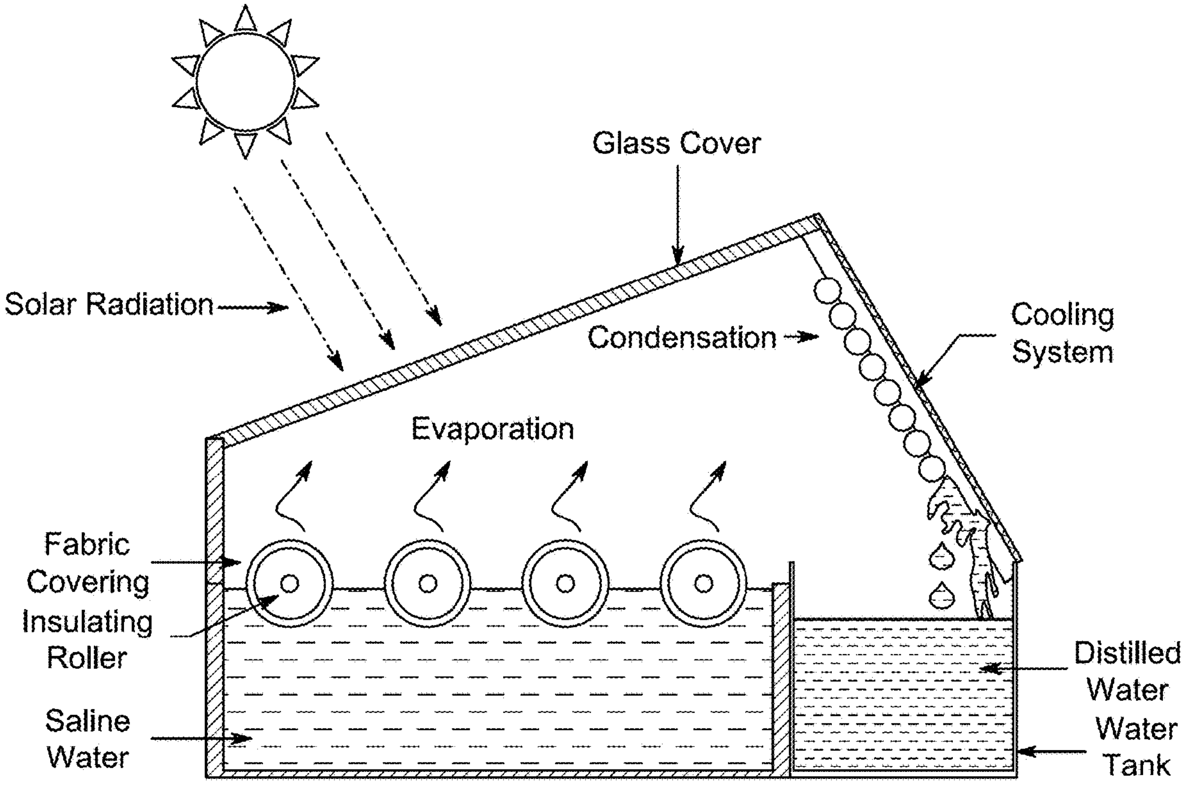
FIG. 7 is a schematic representation of a fabric covering and insulating roller replaced with the MO-decorated 3D MO-GO nanoscrolls, according to certain embodiments.

While the preferred embodiment employs GO-ZnO and GO-FeO composites, alternative configurations are feasible. Different metal oxides, such as CuO, $TiO_2$, or $Al_2O_3$, may be substituted to tailor the absorption spectrum for specific regions. Hybrid base fluids, including ethylene glycol, ethanol, or saline water, may be used depending on thermal requirements. The nanofluid may be integrated into various collector geometries, such as tubular, parabolic, or flat-panel DASCs. GO concentration may range from 10% to 90% by weight to balance stability and cost. Additionally, the nanofluid may be combined with phase-change materials to store absorbed heat, enabling night-time purification cycles. FIGS. 4A-4H and FIG. 6C illustrate various nanoscroll formations, and FIG. 7 shows the replacement of conventional rollers with MO-decorated 3D GO-MO nanoscrolls.

The present disclosure offers several advantages over traditional solar collectors. By absorbing radiation volumetrically, solar collectors nearly eliminate surface heat losses associated with black-plate collectors and yield photothermal conversion efficiencies up to 92%, exceeding the 23-42% observed for earlier GO or ZnO nanofluids. The composite exhibits improved stability, preventing sedimentation and agglomeration, as verified by the Beer-Lambert correlation, and may be produced at a lower cost using readily available reagents and simple processing compared to plasma- or chemical vapor deposition (CVD)-based methods. The hybrid composition captures both UV and visible light, expanding usable solar energy, and operates without chemical reagents or external energy, promoting eco-sustainability. Validated under natural solar irradiance for multiple days, the system demonstrates scalability and reliability for both domestic and industrial deployment, ensuring consistent long-term performance.

In some embodiments, the disclosure provides a GO-based composite nanofluid system for direct solar absorption and photothermal water purification, combining GO with metal oxide nanoparticles such as ZnO or FeO in defined weight ratios to create a stable, low-cost, and highly efficient nanofluid. The system absorbs sunlight volumetrically, eliminating intermediate heat-transfer losses, and the hybrid nanocomposite design enhances absorption across the ultraviolet and visible ranges while maintaining dispersion stability, as validated by the Beer-Lambert correlation. The nanoparticle morphology at sizes under 100 nm minimizes agglomeration, yielding up to 92% photothermal conversion efficiency at a concentration of 0.03 wt. %. Fabricated via simple hydrothermal synthesis from inexpensive precursors, the system is scalable, eco-friendly, and solar-powered. The system is applicable to household, community, and industrial desalination, portable evaporators, hybrid renewable energy systems, wastewater treatment, and solar steam generation, offering commercial relevance, low operational costs, energy independence, and environmental sustainability.

Numerous modifications and variations of the present disclosure are possible in light of the above teachings. It is therefore to be understood that within the scope of the appended claims, the invention may be practiced otherwise than as specifically described herein.

The invention claimed is:

1. A solar-driven desalination system comprising:

a longitudinal photothermal evaporator having a first end and a second end, wherein the photothermal evaporator comprises:

a photothermal layer comprising a plurality of three-dimensional graphene-oxide-metal-oxide (3D GO-MO) nanoscrolls and a plurality of second metal-oxide (MO) nanoparticles disposed on inner and outer surfaces of the 3D GO-MO nanoscrolls;

wherein the 3D GO-MO nanoscrolls are oriented along at least one of a horizontal axis and a vertical axis to the photothermal evaporator;

a thermal insulation layer comprising at least one of an aerogel-based thermal barrier and a polymeric foam, wherein the thermal insulation layer is positioned beneath the photothermal layer;

a microfluidic wicking lattice layer positioned beneath the thermal insulation layer and configured to deliver saltwater to the photothermal layer;

a vapor transport architecture disposed above the photothermal layer and extending toward the first end and the second end of the photothermal evaporator, wherein the vapor transport architecture comprises a plurality of microtransport channels dimensioned to receive and transport water vapor generated at the photothermal layer during solar irradiation; and at least two condensers positioned at the first and second ends of the photothermal evaporator and connected to the vapor transport architecture.

2. The system of claim 1, wherein the photothermal layer comprises:

a hierarchical pore network having pore diameters between about 10 and 500 nm;

patterned hydrophilic and hydrophobic surface regions configured to direct water infiltration toward interiors of the 3D GO-MO nanoscrolls and promote vapor escape from outer surfaces of the 3D GO-MO nanoscrolls;

the 3D GO-MO nanoscrolls arranged in axially aligned arrays in which scroll axes form an angle between about 10 and 45° relative to a direction of the solar irradiation; and the second MO nanoparticles are disposed on the 3D GO-MO nanoscrolls at a loading between about 5 and 40 wt. % relative to the total weight of the 3D GO-MO nanoscrolls.

3. The system of claim 1, wherein the 3D GO-MO nanoscrolls comprise:

a helical pitch between about 50 and 500 nm;

a radially graded diameter distribution in which an inner-region exhibits a scroll diameter between about 50 and 150 nm and an outer-region exhibits the scroll diameter between about 150 and 500 nm;

a scroll-wall thickness between about 5 and 50 nm;

an internal channel diameter between about 20 and 300 nm;

a lateral dimension between about 5 and 200 μm;

an aspect ratio between about 10:1 and 200:1; and a helical curvature uniformity having a longitudinal pitch deviation within about 5 to 20 nm between adjacent helical turns of the 3D GO-MO nanoscrolls.

4. The system of claim 1, wherein the second MO nanoparticles are disposed:

on inner surfaces of the 3D GO-MO nanoscrolls with an average diameter between about 2 and 10 nm;

on outer surfaces of the 3D GO-MO nanoscrolls with an average diameter between about 10 and 50 nm;

with an axial surface-density gradient between about $10^9$ and $10^{12}$ particles·$cm^{-2}$;

wherein at least a portion of the second MO nanoparticles forms nanoscale clusters having an average diameter between about 5 and 100 nm; and wherein the second MO nanoparticles are selected from the group consisting of molybdenum disulfide ($MoS_2$), vanadium oxide ($V_2O_5$), silver vanadate ($AgVO_3$), copper oxide (CuO), cobalt oxide ($Co_3O_4$), tungsten oxide ($WO_3$), and nickel oxide (NiO).

5. The system of claim 1, wherein the thermal insulation layer comprises:

an anisotropic thermal-conductivity profile having an in-plane thermal conductivity at least 2× greater than a through-plane thermal conductivity;

a plurality of radiative-reflective microdomains selected from the group consisting of silica microspheres, hollow glass particles, and alumina platelets;

an upper surface comprising a hydrophobic coating and a lower surface comprising a hydrophilic coating; and a plurality of embedded microvoid channels dimensioned to trap stagnant air and stabilize a vertical thermal gradient between the photothermal layer and the microfluidic wicking lattice.

6. The system of claim 1, wherein the microfluidic wicking lattice comprises:

a plurality of interconnected microchannels arranged in at least one of a helical pattern, an orthogonal grid, and a radial-spoke geometry;

a lateral diffusion pathway configured to divert accumulated salt ions away from the thermal insulation layer and the photothermal layer;

a network of a hydrophilic fiber selected from the group consisting of a polyvinyl alcohol fiber, a cellulose-based plant fiber, and a cotton microbundle; and wherein each hydrophilic fiber has a surface energy between about 40 and 75 mN·$m^{-1}$ to maintain continuous capillary flow under salinity levels up to about 20 wt. % relative to the total weight of the saltwater.

7. The system of claim 1, wherein the vapor transport architecture comprises:

a transparent membrane, having a curvature radius between about 20 and 150 mm, positioned between about 5 and 15 mm above the photothermal layer;

wherein the transparent membrane is selected from the group consisting of borosilicate glass, fused silica, polycarbonate, polyethylene terephthalate, and fluorinated ethylene propylene;

interior surfaces comprising a hydrophobic coating selected from the group consisting of a fluorinated silane coating, a perfluoropolyether coating, and a polytetrafluoroethylene-based coating;

a support frame formed from a material selected from the group consisting of aluminum, copper, anisotropic pyrolytic graphite, and thermally conductive polymer composite; and wherein the support frame is configured to maintain a longitudinal thermal gradient toward the first and second ends and a radial thermal gradient away from the photothermal layer.

8. The system of claim 1, wherein the microtransport channels comprise:

a variable-diameter segment having a constricted throat region configured to increase vapor velocity and maintain a longitudinal pressure gradient toward the first and second ends of the photothermal evaporator;

a micropillar lattice comprising a plurality of micropillars having a height between about 20 and 200 μm and a center-to-center spacing between about 30 and 300 μm;

an interior wall comprising a plurality of condensate-bypass grooves dimensioned to divert condensed droplets away from a vapor-flow pathway; and wherein the microtransport channels have a hydraulic diameter between about 50 and 500 μm, a throat-region diameter between about 20 and 150 μm, a channel length between about 2 and 50 mm, and a groove aspect ratio between about 2 and 10.

9. The system of claim 1, wherein each condenser comprises:

a surface coating selected from the group consisting of a hydrophobic fluoropolymer, a nano-textured silica, and a copper-oxide nanoblade;

a plurality of condensate-routing microchannels dimensioned to direct condensed water toward a collection reservoir;

an anti-fouling coating selected from the group consisting of graphene-based coatings, diamond-like carbon coatings, and perfluorinated alkyl coatings;

a convective cooling surface comprising a microfin array having a fin height between about 0.5 and 10 mm and a fin spacing between about 0.2 and 2 mm; and a base plate operatively coupled to the microfin array and configured to maintain a temperature at least 5° C. below the vapor transport architecture during operation.

10. The system of claim 1, wherein the 3D GO-MO nanoscrolls are formed by:

reacting a graphene oxide sheet and first metal-oxide (MO) nanoparticles in an aqueous solution at a temperature between about 120 and 200° C. for about 6 to 24 hours to form a GO-MO hydrogel;

wherein the first MO nanoparticles are selected from the group consisting of zinc oxide (ZnO), iron oxide ($Fe_3O_4$), copper oxide (CuO), titanium dioxide ($TiO_2$), aluminum oxide ($Al_2O_3$), cerium oxide ($CeO_2$), and manganese oxide ($MnO_2$);

supercritical drying the GO-MO hydrogel to produce a GO-MO aerogel; and fragmenting the GO-MO aerogel into GO-MO flakes and scrolling the GO-MO flakes into the 3D GO MO nanoscrolls by applying a scrolling stimulus selected from sonication, chemical intercalation, thermal treatment, and pH-triggered curling.

* * * * *